US012769675B2

(12) United States Patent
Soffer

(10) Patent No.: US 12,769,675 B2
(45) Date of Patent: Oct. 20, 2026

(54) METHOD AND SYSTEM FOR A REMOTE CONSOLE FOR SECURE KVM SWITCH

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 24 days.

(21) Appl. No.: 18/907,528

(22) Filed: Oct. 6, 2024

(65) Prior Publication Data

US 2025/0045210 A1 Feb. 6, 2025

Related U.S. Application Data

(63) Continuation-in-part of application No. PCT/IB2023/053080, filed on Mar. 28, 2023.

(Continued)

(51) Int. Cl.
*G06F 13/10* (2006.01)
*G06F 3/023* (2006.01)

(Continued)

(52) U.S. Cl.
CPC ........ *G06F 13/102* (2013.01); *G06F 2213/40* (2013.01)

(58) Field of Classification Search
CPC .... G06F 13/102; G06F 2213/40; G06F 3/023; G06F 13/4004; G06F 13/4022;

(Continued)

(56) References Cited

U.S. PATENT DOCUMENTS 8,473,651 B1 * 6/2013 Sundaravel ........... G06F 3/0227 710/1
12,003,660 B2 * 6/2024 Bernardi ............... H04L 67/104

(Continued)

FOREIGN PATENT DOCUMENTS

WO WO2021245644 A1 12/2021

OTHER PUBLICATIONS

"Secure Analogue and Digital KVM Switches" Downloaded from https://www.commoncriteriaportal.org/files/epfiles/t265_st.pdf, Nov. 26, 2010, Adder Technology Ltd, Cambridge, UK.

*Primary Examiner* — Idriss N Alrobaye
*Assistant Examiner* — Henry W Yu
(74) *Attorney, Agent, or Firm* — AlphaPatent Associates Ltd.; Daniel J. Swirsky

(57) ABSTRACT

A computing system, a secure peripheral sharing device, a remote console subsystem and a method for operating a remote console over a secure peripheral sharing device is disclosed. The computing system comprising a plurality of hosts; a console comprising at least a keyboard, a mouse and a display; a secure peripheral sharing device; and a remote console subsystem comprising at least another keyboard, another mouse and another display. The secure peripheral sharing device is configured to be connected to the console and the plurality of hosts, the peripheral sharing device is configured to be coupled to the remote console subsystem that is located away from the peripheral sharing device, and the secure peripheral sharing device is configured to connect or couple between either the console or the remote console subsystem and an active host of the plurality of hosts. The peripheral sharing device is configured to switch any one of the plurality of hosts to become the active host. The method receiving requests for open new remote console sessions and upon such request open a remote console session in both the side of the secure peripheral sharing device and the remote console subsystem, and as long as the remote session is active the method performs continuously: receiving video stream from the active host and transferring the video stream to the second display; receiving a keyboard and mouse data from the second keyboard and the second mouse and transferring the keyboard and mouse data to the active host; and upon receiving active host switching commands from a user, switching the active host. The method is receiving requests (Continued)

for close remote console sessions and upon such request close the remote console session and resume working of active host with the console.

39 Claims, 14 Drawing Sheets

Related U.S. Application Data

(60) Provisional application No. 63/329,891, filed on Apr. 12, 2022.

(51) Int. Cl.

*G06F 13/38* (2006.01)
*G06F 13/40* (2006.01)
*G06F 21/85* (2013.01)
*H04L 9/40* (2022.01)

(58) Field of Classification Search

CPC .... G06F 13/4045; G06F 21/85; G06F 13/385; H04L 2463/082; H04L 63/0218; H04L 63/0428; H04L 63/083; H04L 63/0838; H04L 63/0853; H04L 63/0861; H04L 63/0876

USPC ....................................... 710/5, 8, 15, 36–38

See application file for complete search history.

(56) References Cited

U.S. PATENT DOCUMENTS

| | | | | |
|---|---|---|---|---|
| 2005/0010696 | A1 | 1/2005 | Emerson et al. | |
| 2005/0283563 | A1 | 12/2005 | Lou et al. | |
| 2006/0107061 | A1* | 5/2006 | Holovacs | G06F 21/35 713/182 |
| 2010/0100652 | A1* | 4/2010 | Lin | G06F 3/023 710/73 |
| 2012/0179916 | A1* | 7/2012 | Staker | G06F 21/53 713/189 |
| 2013/0159391 | A1 | 6/2013 | Lin et al. | |
| 2014/0019652 | A1 | 1/2014 | Soffer | |
| 2015/0003464 | A1 | 1/2015 | Zhang et al. | |
| 2020/0057508 | A1* | 2/2020 | Menachem | G06F 3/023 |
| 2020/0125771 | A1 | 4/2020 | Soffer | |
| 2022/0035458 | A1* | 2/2022 | Menachem | G06F 3/1438 |

* cited by examiner

Remote Console side

Cellular phone based Remote console side

METHOD AND SYSTEM FOR A REMOTE CONSOLE FOR SECURE KVM SWITCH

FIELD OF THE INVENTION

The present invention, in some embodiments thereof, relates to KVM switches, and more particularly, but not exclusively, to secure KVM switch supporting a remote console.

BACKGROUND OF THE INVENTION

During the corona pandemic many workers started to work from home. In many companies and organization that uses cloud computing and Saas (Software as a Service) the shift to work from home was easy, simply connecting from your home desktop or laptop to the company resources over the Internet. For these organizations who have some software/hardware that are needed to run from the host located in the company premises, a remote terminal software that operate the in-premises computer from remote location over the internet is also a feasible solution. However, workers in organization that need to handle classified data were left without a good solution. Usually, these workers have access from their office to two or more computers, one that is less classified, typically connected to the Internet, and one or more hosts that are connected only to internal, more classified, local area network of the organization. To work efficiently with the plurality of the host, these workers use a secure peripheral sharing device, e.g., KVM switch. Due to security restrictions, working remotely with a remote terminal software is not acceptable option. The objective of the invention is to allow these workers, or users, the ability to securely work from their homes.

SUMMARY OF THE INVENTION

According to aspects of some embodiments of the present invention, a securing method and computing system with remote console operation is provided.

According to an aspect of some embodiments of the present invention there is provided a computing system comprising: a plurality of hosts; a console comprising at least a first keyboard, a first mouse and a first display; a secure peripheral sharing device; and a remote console subsystem comprising at least a second keyboard, a second mouse and a second display, wherein the secure peripheral sharing device is configured to be connected to the console and the plurality of hosts, the peripheral sharing device is configured to be coupled to the remote console subsystem that is located away from the peripheral sharing device, and wherein the secure peripheral sharing device is configured to connect or couple between either the console or the remote console subsystem and an active host of the plurality of hosts, and wherein the peripheral sharing device is configured to switch any one of the plurality of host to become the active host, and wherein a video stream from the active host is transferred to either the first display or the second display, and a keyboard and mouse data is transferred to the active host from either the first keyboard and the first mouse or the second keyboard and the second mouse.

According to an aspect of some embodiments of the present invention there is provided a secure peripheral sharing device comprising: a plurality of ports to be configured to be connected to a plurality of hosts; and a port to be configured to be connected to a console comprising at least a first keyboard, a first mouse and a first display; and a remote console port configured to be coupled to a remote console subsystem comprising at least a second keyboard, a second mouse and a second display, wherein the remote console subsystem is located away from the peripheral sharing device, and wherein the peripheral sharing device is configured to connect or couple between either the console or the remote console subsystem and an active host of the plurality of hosts, and wherein the peripheral sharing device is configured to switch between any one of the plurality of hosts to become the active host.

According to an aspect of some embodiments of the present invention there is provided a remote console subsystem comprising: a port configured to be coupled to a secure peripheral sharing device; and a remote console, wherein, the secure peripheral sharing device is configured to be connected to a plurality of hosts, and to a console comprising at least a first keyboard, a first mouse and a first display, the remote console comprising at least a second keyboard, a second mouse and a second display, the remote console subsystem is located away from the peripheral sharing device, the peripheral sharing device is configured to connect or couple between either the console or the remote console and an active host of the plurality of hosts, and condition upon a switching command from the remote console subsystem, the peripheral sharing device is configured to switch any one of the plurality of hosts to become the active host.

According to some embodiments of the invention, the peripheral device is a secure KVM switch.

According to some embodiments of the invention, at least one peripheral device in the console or the remote console is shared using simultaneous use operation.

According to some embodiments of the invention, at least one peripheral device in the console or the remote console is at least on of or any combination of: a biometric sensor, an identification device, a printer, an audio device, a camera, an external mass storage device, a USB dongle, a phone, and a smartphone.

According to some embodiments of the invention, the connection between the secure peripheral sharing device and the console, and the connection between the remote console subsystem and the remote console is provided by peripheral devices communication protocols, and peripheral devices communication protocols comprises at least one of or any combination of: USB, SPI, I2C, SCSI, FC, IDE, ATA, Firewire, Ethernet, Thunderbolt, InfiniBand, VGA, DVI, HDMI, DisplayPort, Wi-Fi, Bluetooth, and Zigbee.

According to some embodiments of the invention, the coupling between the secure peripheral sharing device and the remote console subsystem is provided by remote console communication protocols, and the remote console communication protocols comprises at least one of or any combination of: Ethernet, SDH, SONET, OTN, FC, InfiniBand, USB, Firewire, Thunderbolt, GSM, CDMA, LTE, 3G, 4G, 5G, TCP/IP, UDP, FTP, HTTP, and SNMP.

According to some embodiments of the invention, the remote console communication protocol transfers video stream, the keyboard and mouse data, and active host selection commands.

According to some embodiments of the invention, the remote console communication protocol further transfers: additional video streams, session control and authentication data, and data of additional peripheral devices.

According to some embodiments of the invention, the communication between the remote console subsystem and the secure peripheral sharing device is encrypted.

According to some embodiments of the invention, the secure peripheral sharing device comprises a security unit that perform at least one or any combination of (a) encrypt data sent to the remote console subsystem, (b) decrypt data received from the remote console subsystem, and (c) authenticate the remote console subsystem.

According to some embodiments of the invention, an authentication procedure is performed between secure peripheral sharing device and remote console subsystem, and the authentication procedure comprises at least one of or any combination of: (a) Hardware ID authentication, (b) biometric authentication, (c) smart card authentication, (d) password authentication, (e) one time password authentication, and (f) multi-factor authentication.

According to some embodiments of the invention, the secure peripheral sharing device communicates with the remote console subsystem using at least one of: (a) Ethernet modem, (b) Wi-Fi modem, and (c) 5G cellular modem.

According to some embodiments of the invention, the paths between peripheral devices and hosts in the system comprises device emulators and host emulators.

According to some embodiments of the invention, the secure peripheral sharing device comprises device emulators and host emulator for peripheral devices.

According to some embodiments of the invention, the remote console subsystem comprises host emulators configured to communicate with device emulators for any one of the peripheral devices of the remote console subsystem.

According to some embodiments of the invention, the video processing between hosts and displays comprises at least one of or any combination of: (a) compression, (b) decompression, (c) packetizing, (d) video format conversion, and (e) display EDID emulation.

According to some embodiments of the invention, the remote console subsystem comprises at least one of: (a) a desktop computer, (b) a laptop computer, (c) a notebook computer, (d) a tablet, (e) a PDA, (f) a smartphone, and (g) a thick, a thin or a zero client.

According to some embodiments of the invention, the remote console subsystem comprises front panel or auxiliary front panel to receive active host selection commands from these panels.

According to some embodiments of the invention, the secure peripheral sharing device comprises of ordinary secure KVM switch and auxiliary remote console adapter.

According to some embodiments of the invention, the secure peripheral sharing device comprises of basic secure KVM switch and add-on adapter, wherein matching form-factor between basic secure KVM switch and add-on adapter is extension form-factor or bay form-factor.

According to some embodiments of the invention, the secure peripheral sharing device or the remote console subsystem comprises anti-tampering circuitries.

According to some embodiments of the invention, the secure peripheral sharing device is configured to receive enable remote console operation mode from control center.

According to some embodiments of the invention, the remote console subsystem comprises a smartphone and remote console accessory.

According to some embodiments of the invention, the secure peripheral sharing device comprises Ethernet switch to aggregate communication from first Ethernet port and remote console communication to a second Ethernet port.

According to an aspect of some embodiments of the present invention there is provided a method for providing a remote console capability to a secure peripheral sharing device using a remote console subsystem, the secure peripheral sharing device comprises: a plurality of ports to be configured to be connected to a plurality of hosts; a port to be configured to be connected to a console comprising at least a first keyboard, a first mouse and a first display; and a remote console port configured to be coupled to a remote console system, the remote console subsystem comprises: a port configured to be coupled to a secure peripheral sharing device; and a remote console comprising at least a second keyboard, a second mouse and a second display, the method comprises the step of: receiving requests for open new remote console sessions and upon such a request, open a remote console session in both the sides of the secure peripheral sharing device and the side of the remote console subsystem, as long as the remote session is active perform continuously in both the sides the steps of: receiving video stream from the active host and transferring the video stream to the second display; receiving a keyboard and mouse data from the second keyboard and the second mouse and transferring the keyboard and mouse data to the active host; and upon receiving active host switching commands from a user, switching the active host, receiving requests for close remote console sessions and upon such request, close the remote console session and resume working of active host with the console.

According to some embodiments of the invention, the secure peripheral sharing device is a secure KVM switch.

According to some embodiments of the invention, at least one peripheral device in the console or the remote console is shared using simultaneous use operation.

According to some embodiments of the invention, at least one peripheral device in the console or the remote console is at least on of or any combination of: a biometric sensor, an identification device, a printer, an audio device, a camera, an external mass storage device, a USB dongle, a phone, and a smartphone.

According to some embodiments of the invention, the connection between the secure peripheral sharing device and the console, and the connection between the remote console subsystem and the remote console is provided by peripheral devices communication protocols, and peripheral devices communication protocols comprises at least one of or any combination of: USB, SPI, I2C, SCSI, FC, IDE, ATA, Firewire, Ethernet, Thunderbolt, InfiniBand, VGA, DVI, HDMI, DisplayPort, Wi-Fi, Bluetooth, and Zigbee.

According to some embodiments of the invention, the coupling between the secure peripheral sharing device and the remote console subsystem is provided by remote console communication protocols, and the remote console communication protocols comprises at least one of or any combination of: Ethernet, SDH, SONET, OTN, FC, InfiniBand, USB, Firewire, Thunderbolt, GSM, CDMA, LTE, 3G, 4G, 5G, TCP/IP, UDP, FTP, HTTP, and SNMP.

According to some embodiments of the invention, the remote console communication protocol transfers video stream, the keyboard and mouse data, and active host selection commands.

According to some embodiments of the invention, the method is further comprising the steps of transferring additional video streams to additional displays in the remote console subsystem, transferring remote console session control data, transferring data from or to additional peripheral devices.

According to some embodiments of the invention, the method is further comprising the steps of encrypting of the communication between the remote console subsystem and the secure peripheral sharing device.

According to some embodiments of the invention, the method is further comprising the steps of authentication between secure peripheral sharing device and remote console subsystem.

According to some embodiments of the invention, the authentication step comprises at least one of or any combination of: (a) Hardware ID authentication, (b) biometric authentication, (c) smart card authentication, (d) password authentication, (e) one time password authentication, and (f) multi-factor authentication.

According to some embodiments of the invention, the steps of transferring data are using at least one of: (a) Ethernet modem, (b) Wi-Fi modem, and (c) 5G cellular modem.

According to some embodiments of the invention, the method is further comprising the steps of emulating host in front of peripheral devices and emulating peripheral devices in front of hosts.

According to some embodiments of the invention, the method is further comprising at least one of or any combination of the steps of: (a) video compression, (b) video decompression, (c) video packetizing, (d) video format conversion, and (e) display EDID emulation.

According to some embodiments of the invention, the remote console subsystem comprises at least one of: (a) a desktop computer, (b) a laptop computer, (c) a notebook computer, (d) a tablet, (e) a PDA, (f) a smartphone, and (g) a thick, a thin or a zero client.

According to some embodiments of the invention, the remote console subsystem comprises front panel or auxiliary front panel to receive active host selection commands from these panels.

According to some embodiments of the invention, the method is further comprising the step of enabling remote console operation mode from control center.

According to an aspect of some embodiment, a computing system having remote desktop capabilities comprising: one or more server-side hosts; one or more client-side hosts comprising a console, the console comprising at least a first keyboard, a first mouse and a first display; and one or more remote desktop isolators, wherein, each of the remote desktop isolator comprises: a client-side desktop isolator layer, an isolator layer, and a server-side desktop isolator layer, the client-side desktop isolator layer is connected to one of the one or more client-side hosts via communication link providing RDP communication services, the server-side desktop isolator layer is connected to the one of the one or more server-side hosts via communication link providing RDP communication services, at least one of the above communicating pairs of server-side host and client-side host that communicate using the RDP protocol with each other exclusively able to communicate using the RDP protocol through one of the one or more remote desktop isolators, and the isolation layer of each one of the one or more remote desktop isolators enforces a data flow of only a raw data information from or to client-side peripheral devices of the console of the client-side hosts in order to reduce the risks of cyber-attacks performed through the RDP protocol.

According to some embodiment of the invention, the computing system wherein the client-side desktop isolator layer comprises a client-side isolator processor runs a client-side remote desktop isolator software.

According to some embodiment of the invention, the computing system, wherein the client-side isolator processor is a host, a circuitry, an FPGA, or a computer which implement at least one of thin, thick, or zero client processing architecture.

According to some embodiment of the invention, wherein the client-side isolator processor is capable of running at least one of (1) Microsoft windows over X86 microprocessor architecture, and (2) Linux operating system over ARM based architecture.

According to some embodiment of the invention, wherein the client-side isolator processor is capable of running client-side remote desktop isolator software comprising at least one of (1) remote desktop server (RDS) from Microsoft (2) freeRDP, (3) rdesktop, (4) LogMeIn, (5) Anydesk, (6) Apple remote desktop, (7) GoToMyPC, (8) XenApp from Citrix, (9) PCanywhere, and (10) xrdb.

According to some embodiment of the invention, wherein the client-side isolator processor comprises a customized version of client-side remote desktop isolator software that is the sole executable software of client-side isolator processor and the software code is stored in a read-only memory whereby hacking the processor with malicious code is less possible.

According to some embodiment of the invention, wherein the client-side isolator layer receives keyboard and mouse (KM) data from client-side remote desktop software and transmit the KM data to server-side remote desktop software through the isolator layer of the remote desktop isolator, and wherein the isolator layer comprises KM unidirectional isolator that enforce unidirectional communication whereby only the KM data can be passed from the client side to the server side.

According to some embodiment of the invention, wherein the server-side isolator layer receives the video data from server-side remote desktop software, the isolator layer comprises video unidirectional isolator that enforce unidirectional transfer of a raw data video stream of the video data, transmit the raw data video stream to client-side remote desktop isolator software whereby only the video signals can be passed from the server side to the client side. According to some embodiment of the invention, wherein the raw data video stream is any one of (a) analog video, (b) VGA, (c) DVI, (d) HDMI, and (e) DisplayPort.

According to some embodiment of the invention, wherein the isolator layer comprises audio unidirectional isolator that enforce audio signals data transfer only from the client-side desktop isolator layer to server-side desktop isolator layer or only from the server-side desktop isolator layer to client-side desktop isolator layer.

According to some embodiment of the invention, wherein the isolator layer comprises video unidirectional isolator that enforce video signals data transfer only from the client-side desktop isolator layer to server-side desktop isolator layer or only from the server-side desktop isolator layer to client-side desktop isolator layer.

According to some embodiment of the invention, wherein the isolator layer comprises isolator elements that filter and enforce unidirectional transfer of only a raw data of the peripheral devices of the console of client-side host from at least one of (a) a microphone, (b) an audio device, (c) a camera, (d) a smart card reader, (e) a biometric sensor, (f) a printer, (g) an external mass storage device, (h) a USB dongle, and (i) a smartphone.

According to some embodiment of the invention, wherein the remote desktop isolator comprises server-side interface that communicate using RDP protocol with server-side host using at least one of (a) a local area network (LAN), (b) an Ethernet, (c) an optical link.

According to some embodiment of the invention, wherein the server-side desktop isolator layer comprises a server-side isolator processor runs a server-side remote desktop isolator software.

According to some embodiment of the invention, wherein the server-side isolator processor is a host, a circuitry, an FPGA, or a computer which implement at least one of thin, thick, or zero client processing architecture.

According to some embodiment of the invention, wherein the client-side isolator processor is capable of running at least one of (1) Microsoft windows over X86 microprocessor architecture, and (2) Linux operating system over ARM based architecture.

According to some embodiment of the invention, wherein the server-side isolator processor is capable of running client-side remote desktop isolator software comprising at least one of (1) remote desktop server (RDS) from Microsoft (2) freeRDP, (3) rdesktop, (4) LogMeIn, (5) Anydesk, (6) Apple remote desktop, (7) GoToMyPC, (8) XenApp from Citrix, (9) PCanywhere, and (10) xrdb.

According to some embodiment of the invention, wherein remote desktop isolator converts video formats between video formats transferred in RDP protocols and video formats transferred between host and displays which are used in the isolator layer.

According to some embodiment of the invention, wherein the server-side desktop isolator layer and the client-side desktop isolator layer are using different RDP protocol.

According to some embodiment of the invention, wherein the console of the client-side host comprises peripheral device for authentication, wherein an RDP session between the client-side host and the remote desktop isolator is not active before completing the authentication of a user by the remote desktop isolator or the server-side host.

According to some embodiment of the invention, wherein the communication between client-side host and the remote desktop isolator is encrypted.

According to some embodiment of the invention, wherein at least a plurality of the one or more remote desktop isolators are implemented by a remote desktop multi-session isolator and at least a plurality of the one or more server-side hosts is implemented by host virtualization machines/farm, and wherein the assignment of client-side host to remote desktop isolator and to server-side host is dynamically assigned or statically assigned.

According to some embodiment of the invention, wherein the remote desktop sessions and user authentication are monitored and managed by management subsystem, and wherein the monitoring and management are either automatic or manual or combined.

According to some embodiment of the invention, wherein at least one of the one or more server-side hosts resides on a private isolated network, the client-side desktop isolator layer is connected to the private isolated layer and the server-side desktop isolator layer is connected to the Internet.

According to some embodiment of the invention, wherein a firewall is deployed between the private isolated network and the Internet, and wherein the firewall blocks the access of remote desktop services so that remote desktop services are only available through the remote desktop isolator.

According to some embodiment of the invention, wherein at least one of the one or more server-side hosts resides on the Internet, the server-side desktop isolator layer is connected to the server-side host through a firewall that restrict the connection to the one or more server-side hosts and only RDP data, and the client-side desktop isolator layer is connected to a local network or the Internet.

Unless otherwise defined, all technical and/or scientific terms used herein have the same meaning as commonly understood by one of ordinary skill in the art to which the invention pertains. Although methods and circuitries similar or equivalent to those described herein can be used in the practice or testing of embodiments of the invention, exemplary methods and/or circuitries are described below. In case of conflict, the patent specification, including definitions, will control. In addition, the circuitries, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a flash memory and/or removable media, for storing instructions and/or data.

BRIEF DESCRIPTION OF THE DRAWINGS

Some embodiments of the invention are herein described, by way of example only, with reference to the accompanying drawings. The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic view of the system in accordance with the present invention;

FIG. 2 is a schematic view of the system with a more detailed design of a secure peripheral sharing device in accordance with some embodiment of the present invention;

FIG. 3 is a schematic view of the KM unit presented in FIG. 2 accordance with some embodiments of the present invention;

FIG. 4 is a schematic view of the video unit presented in FIG. 2 accordance with some embodiments of the present invention;

FIG. 5 is a schematic view with more detailed design of a remote console subsystem in accordance with some embodiment of the present invention;

FIG. 6 is an isometrical view of a user's desk comprising the remote console side of the system in accordance with an exemplary embodiment of the present invention;

FIG. 7 is a schematic view of another embodiment of the remote console subsystem in accordance with some embodiment of the present invention;

FIG. 8 is a schematic view of yet another embodiment of the remote console subsystem in accordance with some embodiment of the present invention;

FIG. 9 is a schematic view of another embodiment of the secure peripheral sharing device side in accordance with some embodiment of the present invention;

FIG. 10 is a schematic view of yet another embodiment of the secure peripheral sharing device side in accordance with some embodiment of the present invention; and FIG. 11 is a flowchart view of a method for providing remote console to a secure KVM switch in accordance with some embodiment of the present invention;

FIG. 12 is a simplified block diagram of a remote desktop system in accordance with some embodiment of the present invention;

Figure 13:
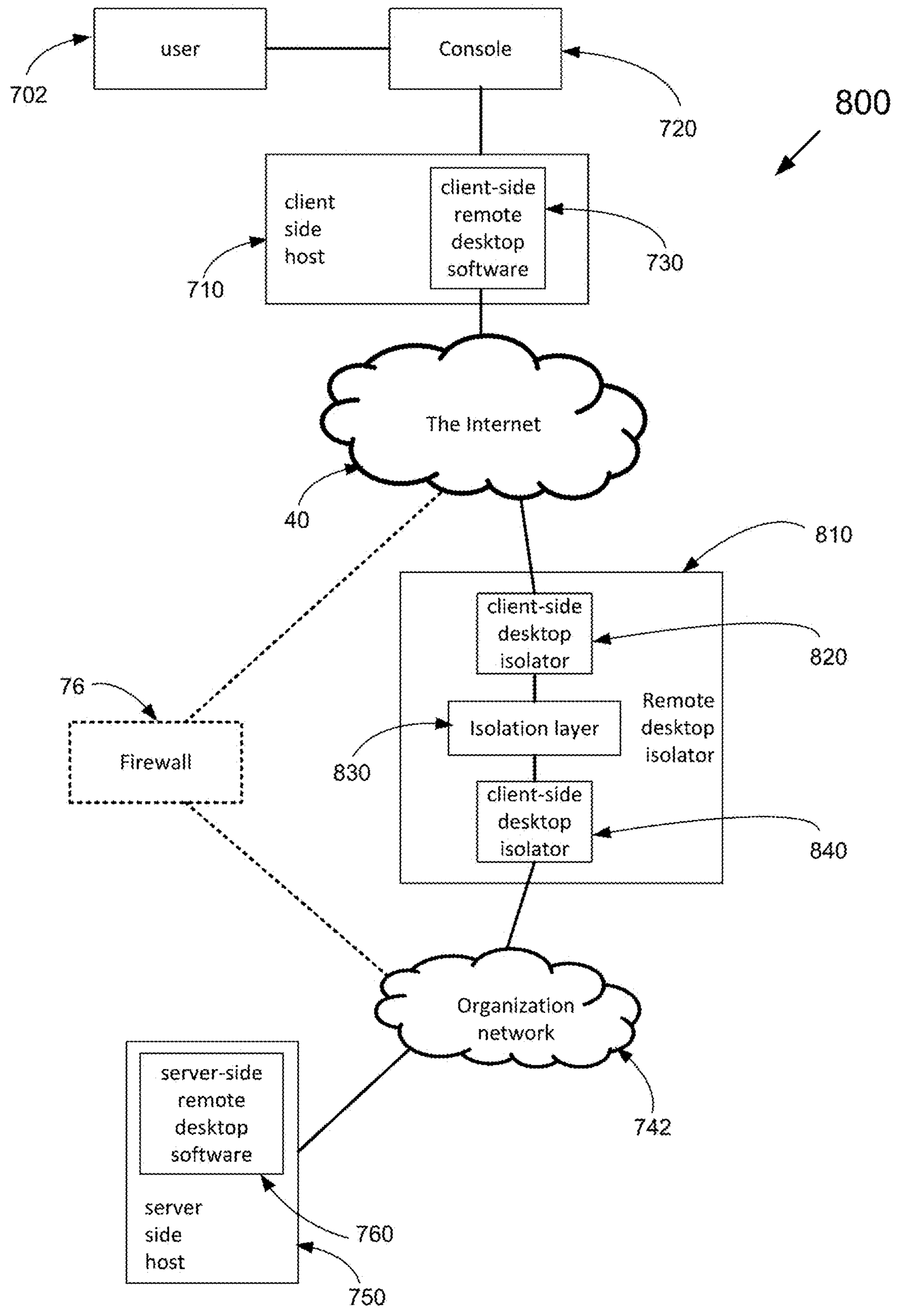
Figure 14:
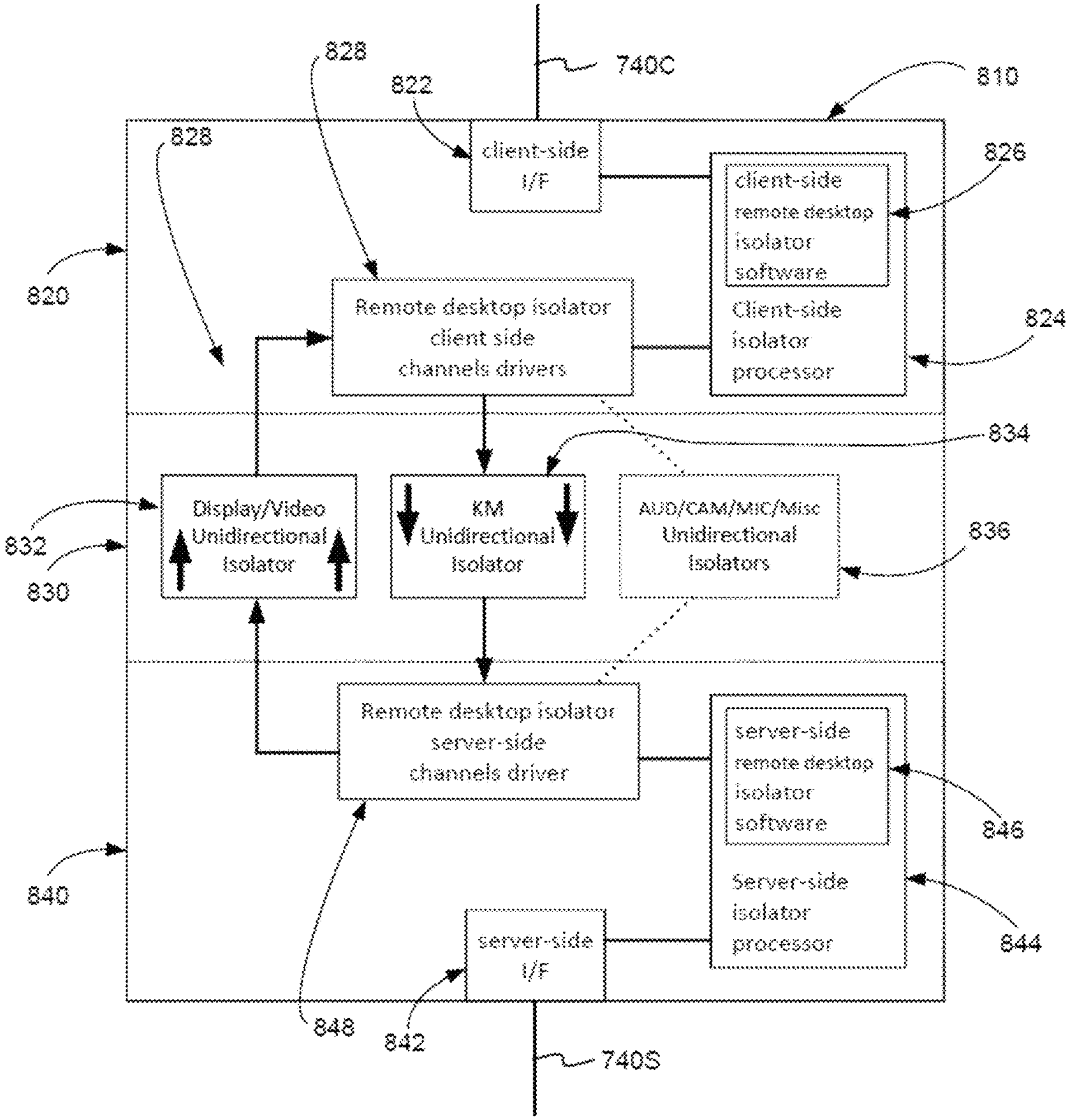
Figure 15:
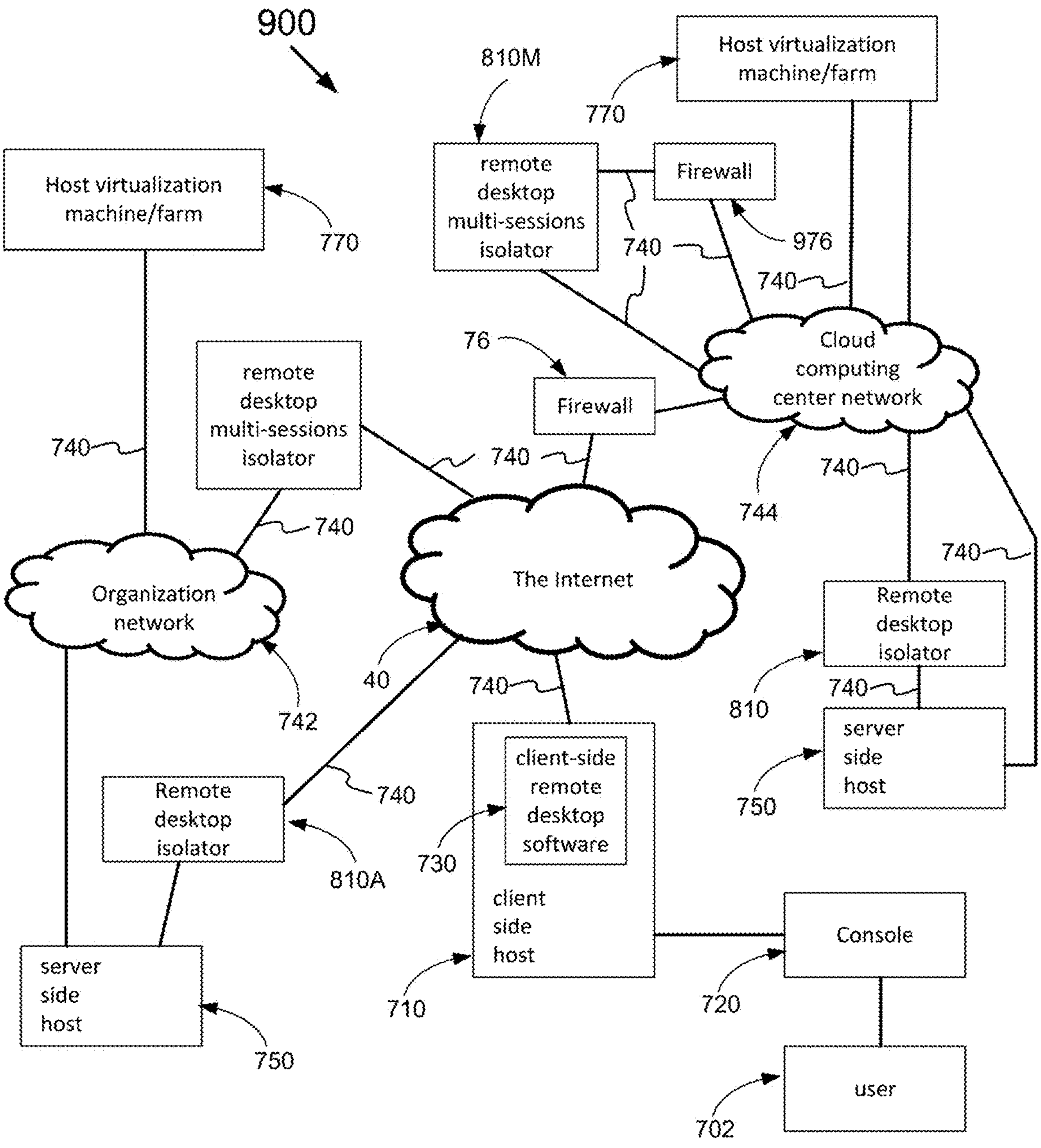

FIG. 13 is a conceptual remote desktop solution system using a remote desktop isolator in accordance with some embodiment of the present invention;

FIG. 14 is a conceptual block of the remote desktop isolator in accordance with some embodiment of the present invention; and FIG. 15 is a block diagram presenting several deployment options for remote desktop systems incorporating remote desktop isolators in accordance with some embodiment of the present invention.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, “processing”, “computing”, “calculating”, “determining”, “establishing”, “analyzing”, “checking”, or the like, may refer to operation(s) and/or process(es) of a state machine, a micro-controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms “plurality” and “a plurality” as used herein may include, for example, “multiple” or “two or more”. The terms “plurality” or “a plurality” may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The present invention, in some embodiments thereof, relates to KVM switches, and more particularly, but not exclusively, to secure KVM switch supporting remote console.

The trend of working from home becomes very popular during the coronavirus pandemic and cause difficulties in organizations that need to handle classified data. Typically, in these organizations, workers have two or more host computers at their office's desktop, one that is less classified, typically connected to the Internet, and one or more host computers that are connected to local or internal, more classified, local area networks (LANs) that deployed inside the organization. To work efficiently with the plurality of the host computers, the workers use a secure peripheral sharing device, e.g., secure KVM switch. In the following embodiment and examples, we present an apparatus and method to allow workers, or users, to work with their office's computers from home using a new, modified, upgraded or extended secure peripheral sharing device.

Figure 1:
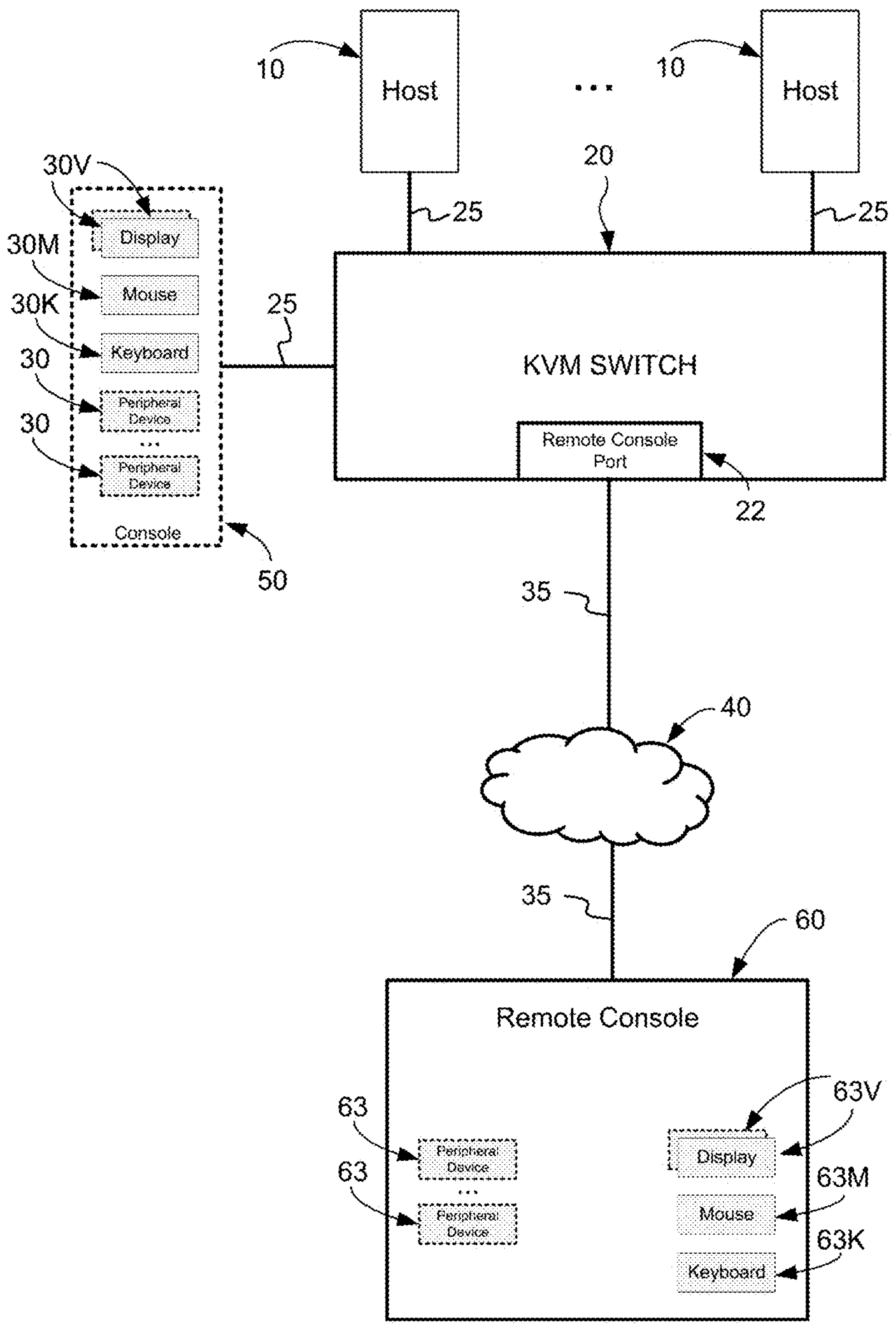

Reference is made first to FIG. 1. FIG. 1 illustrates a typical configuration of a computing system. The system comprises a secure peripheral sharing device 20, supports two hosts 10 and a console 50. The secure peripheral sharing device 20, in accordance with the invention, also supports a novel port, a remote console port 22. The remote console port 22 is connected using remote console communication protocol 35 to a Wide Area Network (WAN) 40, usually the Internet. The WAN 40 is connected to a remote console subsystem 60. Remote console 60 resides away or outside the premises of the organization so several security issues need to be taken care for working with this remote console subsystem 60, these issues will be discussed later on.

As used herein the term “console” means a collection (a set) of peripheral devices, such as keyboard 30K, mouse 30M, one or more displays 30V and, optionally, other peripheral devices 30. Console's 50 peripheral devices are used by a user to interact with hosts 10. The peripheral devices 30 of console 50 typically reside on the user's desktop or in a close proximity to the user, e.g., in a single room, single office, or on or more adjacent desks. The console may include a display 30V, or a plurality of displays 30V. Console devices 30 may include printers, cameras, microphones, speakers, smart card readers, biometric sensors, identification devices, external mass storage devices, USB dongles, mobile terminals such as smartphones and the like. The console 50 devices are connected to host 10 using peripheral devices communication protocols 25.

Peripheral devices communication protocols 25 may be parallel buses, serial buses, Universal Serial Bus (USB), and many other types of communication protocols, such as, SPI, I2C, CAN bus, SCSI, Fiber Channel (FC), IDE, ATA, PCI, PCI-x, IEEE 1394 (Firewire), Ethernet, Thunderbolt, InfiniBand and the like. In some cases, peripheral devices communication protocols 25 may be used to coupled host 10 to display 30V. Video communication protocol, in this case may be VGA, DVI, HDMI, DisplayPort (DP) or the like.

The video communication protocol may include data transfer for "plug and play" experience, e.g., Display Data Channel (DDC).

Peripheral devices communication protocols 25 may aggregate communication between host 10 to several peripheral devices 30. For example, a single USB 3.0 communication protocol 25 may be used to connect host 10 to display 30V, keyboard 30K and mouse 30M.

In an exemplary embodiment of the invention, peripheral devices communication protocols 25 may be wireless protocols such as Wi-Fi, Bluetooth, Zigbee and the like.

As used herein, the term "remote console subsystem" or alternatively in brief "remote console" means the subsystem that support the remote operation of a collection (a set) of peripheral devices, such as keyboard 63K, mouse 63M, one or more displays 63V and, optionally, other peripheral devices 63. Typically, the term "remote console subsystem" is more intended to describe various types of embodiments that include one or more devices that operate together in the remote console location and enable the remote console operation, while "remote console" is more intended to describe the peripheral devices 63, 63K, 63V, 63M themselves. However, in some embodiments, full separation between the two terms is not always possible so the terms are used interchangeably and it might be referred both to the peripheral devices as well as to the supporting subsystem around the peripheral devices.

In an exemplary embodiment of the invention, remote console communication protocol 35 may be Ethernet, optical communication protocols, such as, SDH, SONET, OTN, Fiber Channel (FC), InfiniBand, Universal Serial Bus (USB), IEEE 1394 (Firewire), Thunderbolt, cellular communication protocols, such as, GSM, 3G, 4G, 5G, and the like. Remote console communication protocol 35 may use network protocols, such as, IP, IPsec, and the like, transport layer protocols, such as TCP/IP, UDP and the like, and application layer protocols, such as, FTP, HTTP, SNMP, and the like. It should be noted that typically remote console communication protocol is multiplexed or running over, communication infrastructure that carry other communication use. For example, if Remote console communication protocol 35 is IP based, typically some of the packets in the link will be part of remote console communication protocol 35 while other packets will be part of other applications/protocols.

Peripheral device 30 may be shared between hosts 10 by two type of operations: (1) switching the connection to the active host, referred as switching operation, or (2) by simultaneous working with all hosts 10, referred as simultaneous use operation. For example, a biometric sensor, such as fingerprint reader peripheral device may keep an authentication session with all hosts so when the active host is changed, i.e., switched, the authentication session is still active, i.e., alive, in all authenticated hosts. The same biometric sensor may be provided with switching operation as well, so that when the user switch to another active host, the authentication session with the previous active host is closed or disconnected, and a new authentication session is initiated or opened with the selected current active host.

Other examples for simultaneous use operations versus switching operations, are given herein for cameras, and speakers. For camera peripheral device, when the camera is open in simultaneous use operation, the camera video stream is split and transferred to all hosts. In switching operation, the video stream is routed, i.e., switched, only to the active host. Sharing may be done with data that are transmitted from the hosts too. For the speakers, simultaneous use operation may be performed by mixing the audio signals from all hosts so regardless of the active host the user can hear simultaneously the audio signals from all the hosts 10. In switching operation, only the audio signals from the active host are played to the speakers in console 50.

Remote console 60, In similar way to console 50, may be coupled to either host 10 through the secure KVM switch 20. The sharing of hosts 10 may be performed by switching operation so that the coupling in any given moment is to the active host or by simultaneous use operation where the coupling is done to a plurality of hosts.

The remote console 60 comprises the same or similar peripheral devices, such as keyboard 63K, mouse 63M and one or more display 63V. Similarly, remote console 60 may comprise additional peripheral devices 63. The peripheral devices 63 may be processed by the secure peripheral sharing device 20 as devices that are shared using simultaneous use operation or shared by switching operation.

The three essential peripherals: keyboard, 30K and 63K, mouse, 30M and 63M and display, 30V and 63V, are usually operated in switching operation mode. The peripheral sharing device that provides the sharing for these three essential peripheral devices, i.e., the switching operation, is known as a KVM switch. For the sake of clarity and brevity this document focuses mainly to the support of a remote console to KVM switch 20. Functions, block diagrams, operations, setup and processing of sharing devices and simultaneous use operations that may be supported by remote console version of a more general secure peripheral sharing device 20 are not in the scope of this document, however the additions and modification that are needed, are apparent to those skilled in the art.

As used herein, the term "peripheral sharing device" means a device that connect a console comprising a set of peripheral devices to a plurality of hosts. Sharing the peripheral device may be provided by switching operation wherein the peripheral devices are connected via a switch to a single active host in any given time, or by simultaneous use operation where the peripheral device works simultaneous with a plurality of hosts.

As used herein, the term "KVM switch" means a device that connect a console comprising a keyboard, a mouse and one or more displays to a plurality of hosts. KVM switch is a specific type of peripheral sharing device where the console comprises a keyboard, a mouse and one or more displays and the sharing of the peripheral device is provided by switching operation. In most cases, the peripheral sharing device comprises a core functionality of a KVM switch.

A secure version of a peripheral sharing device or a KVM switch is a version that provides, among other things, security measures to prevent malicious code reside in one of the hosts (more likely, in the less classified host that is typically connected to the internet) to propagate to the more classified host, and to prevent leakage of data from the more classified host to the less classified host. For example, typical technics that are used in a secure version of a peripheral sharing device or a KVM switch are (1) unidirectional data enforcing devices to allow data flow only in one desired direction that is essentially needed, e.g., keyboard and mouse may be restricted to send data only from the peripheral device to the host, (2) providing emulators that are connected to the peripheral device or the host to mimic the other side while keeping some security measures, and (3) the like.

As used herein, the terms "secure KVM switch" or "secure peripheral sharing device" means KVM switch or peripheral sharing device that uses security measures to protect from cyber-attacks as described hereinabove. For the sake of clarity these elements that are known in the art for KVM switch or peripheral sharing device are no shown or describe in details in the embodiment unless it is closely related to the invention.

From now on, unless specifically mentioned or implicitly derived, when a KVM switch or peripheral sharing device is mentioned, it is related to a secure version of the KVM switch or the peripheral sharing device.

As used herein, the term "connected" may be used to describe a direct connection, such as electrical, or mechanical connection between the things that are connected, without any intermediary components or devices or indirect connection in the same room or same building. In case of electrical connection, the term "connected" may also be used for a connection through cables, connectors, wires, PCB traces, pins, switches, devices or any other element used to establish electric signal connection between the things.

As used herein, the term "coupled" means indirect connection, between the things that are connected via indirect connection, through one or more intermediary cables, components, wireless link or devices and the things are away from each other typically reside in different buildings, or different residential areas.

As used herein, the term "circuitry" means one or more passive and/or active components that are arranged to cooperate with one another to provide a desired one or more functions.

In various embodiments, the mouse may be any type of pointing device, such as, a track ball, a touch pad or the like. In some embodiments, the display may also be referred as the computer monitor, may be any device presenting visual information to the user, including, but not limited to, cathode-ray tube CRT display, Plasma Display, Liquid Crystal Display (LCD), Light-Emitting Diode (LED) display and the like. The computer monitor may come in apparatus form-factor of computer monitor, TV set, head-mounted display, video projector and the like. In some embodiments, the host may also be referred as the host computer means a computer, a workstation, a set-top-box, a server, and the like.

In an exemplary embodiment of the invention, a computing system comprising a plurality of hosts; a console 50 comprising at least a first keyboard 30K, a first mouse 30M and a first display 30V; a secure peripheral sharing device 20; and a remote console subsystem comprising at least a second keyboard 63K, a second mouse 63M and a second display 63V. The secure peripheral sharing device 20 is configured to be connected to the console 50 and the plurality of hosts 10, the peripheral sharing device is configured to be coupled to the remote console subsystem 60 that is located away from the peripheral sharing device. The secure peripheral sharing device 20 is configured to connect or couple between either the console 50 or the remote console subsystem 60 and an active host of the plurality of hosts 10. The secure peripheral sharing device 20 is configured to switch any one of the plurality of hosts 10 to become the active host. The video stream from the active host is transferred to either the first display 30V or the second display 63V, and a keyboard and mouse data is transferred to the active host from either the first keyboard 30K and the first mouse 30M or the second keyboard 63K and the second mouse 63M.

Figure 2:
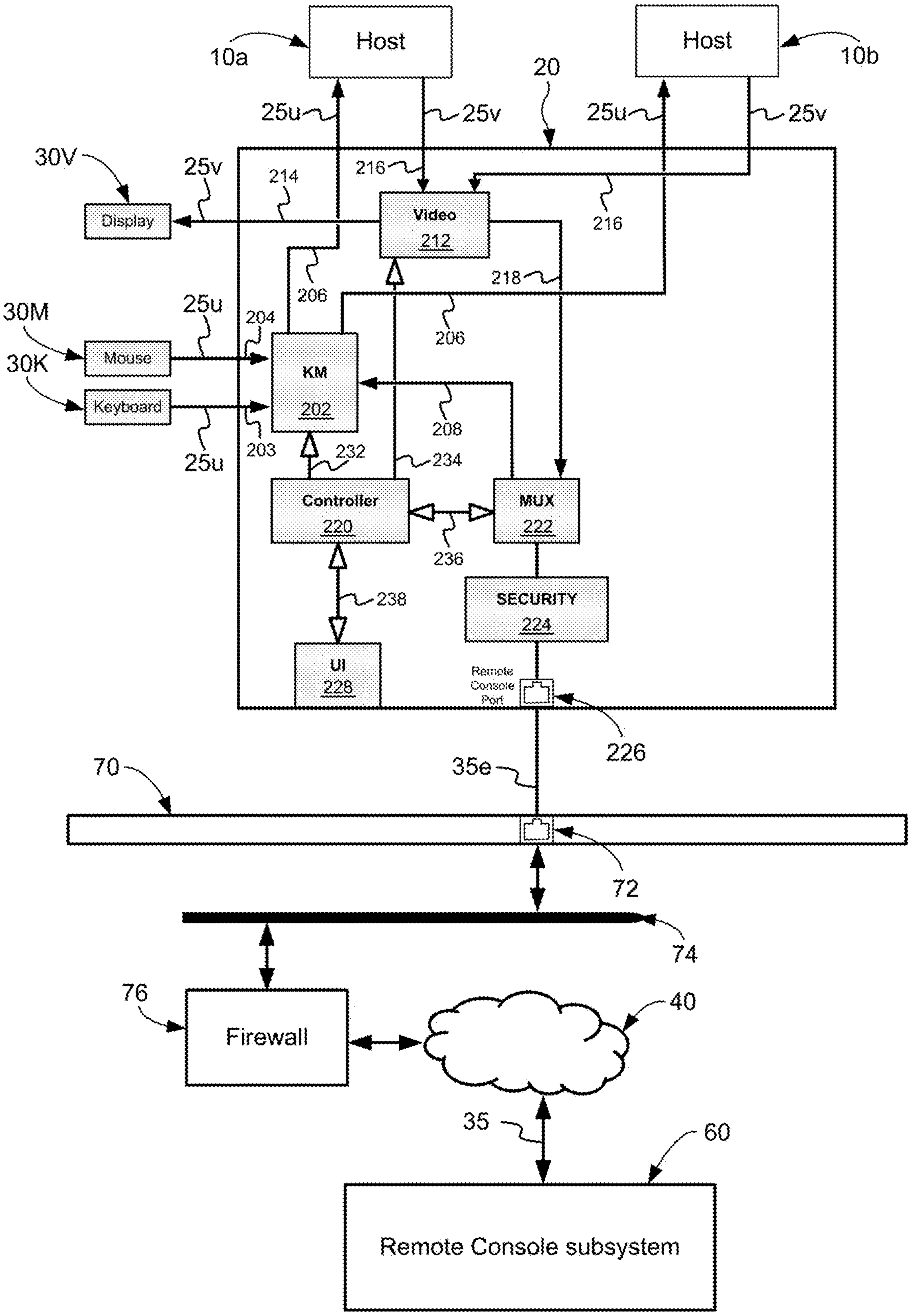

Reference is made now to FIG. 2. FIG. 2 illustrates a more detailed view of the computing system with an internal block diagram of an exemplary embodiment of the secure peripheral sharing device, e.g., the secure KVM switch 20. Secure KVM switch 20 is connected to two hosts 10*a* and 10*b* and to a display 30V, a keyboard 30K and a mouse 30M. In addition, secure KVM switch 20 is coupled to a remote console 60, via Ethernet type remote console port 226.

Display 30V is connected via protocol 25*v* to a video unit 212. Video unit 212 may transmit video to display 30V via connection 214. The video stream may be originated from hosts 10*a* and 10*b* and transferred using video protocol 25*v*, e.g., HDMI. The two video sources from hosts 10*a* and 10*b* are received by video unit 212 via two video connections 216. In addition, video unit 212 may transmit the video stream to display 63V in remote console 60 via connection 218. Connection 218 may use different video format and video protocols, and video unit 212 may convert the video to the desired video protocol. In an exemplary embodiment of the invention, connection 218 carries a compressed video stream protocol. The command to control which one of the video sources, either from hosts 10*a* or from 10*b*, and to which console, 50 or 60 to transmit the video stream, is provided from controller 220 using command lines 234.

The keyboard 30K and the mouse 30M of console 50 are connected via connection lines 203 and 204 using USB peripheral device communication protocol 25*u* to KM unit 202. KM unit 202 aggregates keyboard and mouse data communication to a single composite USB device and sends the data via connection line 206 using USB peripheral device communication protocol 25*u* to either host 10*a* or host 10*b*. In addition, keyboard and mouse data can be received by KM unit 202 from remote console 60 via line 208. The command to control from which keyboard and mouse the keyboard and mouse data is transmitted, either console 50 or remote console 60, and to which host, either host 10*a* or host 10*b*, the keyboard and mouse data, is provided from controller 220 using command lines 232.

To support operating with remote console 60, secure KVM switch 20 comprises a mux unit 222. Mux unit 222 combines all data communication that need to be communicated between remote console 60 and secure KVM switch 20 to a single bidirectional data stream. The data stream contains at least the video stream from either one of the hosts 10*a* or 10*b*, the keyboard and mouse data from remote console 60, and a host selection commands from remote console 60. The host selection commands are transferred from mux 222 to controller 220 via lines 236. Upon receiving the host selection commands, controller 220 set KM unit 202 and video unit 212 via lines 232 and 234 respectively. In addition, data, such as, data from other peripheral devices, such as biometric sensors, identification device in remote console 60, printing data from an active host to a printer peripheral device in the remote console 60, admirative data between remote console client 60 and secure KVM switch 20, and the like, may be provided through the mux unit 222.

Controller 220 communicate with user interface (UI) 228 via lines 236. User interface may be push buttons to select the active host locally, active host indicators, key to enable remote console operation, as well as, other peripheral sharing device controlling, setting and indications that are controlled or monitored by the user.

Mux unit 222 is connected to security unit 224. Security unit 224 is responsible of all issues, actions and functions that are needed to provide the security and cyber-security features that enable secure remote working with secure KVM switch 20, and through the secure KVM switch 20 with the hosts, in general, and with the classified one or more hosts, in particular. To allow secure operation, security unit 224 comprises cryptographic unit. The cryptographic unit assure that the data over remote console communication protocol 35 will be encrypted with strong encryption that is excepted by the operating organization security policy. The encryption unit encrypts data transmitted to the remote console 60 and decrypts the data received from the remote console 60. Security unit 224 may authenticate the remote console 60 to the secure KVM switch 20.

In an exemplary embodiment of the invention, security unit 224 may, additionally or alternatively, authenticate the user himself using biometric means, temporarily password generation dongles, passwords, or the like. Additionally, or alternatively, authentication may be performed directly with the active host.

The bidirectional data stream of security unit 224 is connected to remote console protocol 35. In this exemplary embodiment, the remote console port is Ethernet port 226 and the remote console protocol is Ethernet protocol. The Ethernet cable 35*e* is connecting between Ethernet port 226 and Ethernet port 72, which is located in on the office's wall 70.

The Ethernet port 72 is connected to the organization's local network 74, that in turn, connected to a firewall 76, which is connected to the Internet 40. On the remote location the user operates with the remote console subsystem 60 that is connected to the Internet 40 via another, independent, remote console communication protocol 35.

Figure 3:
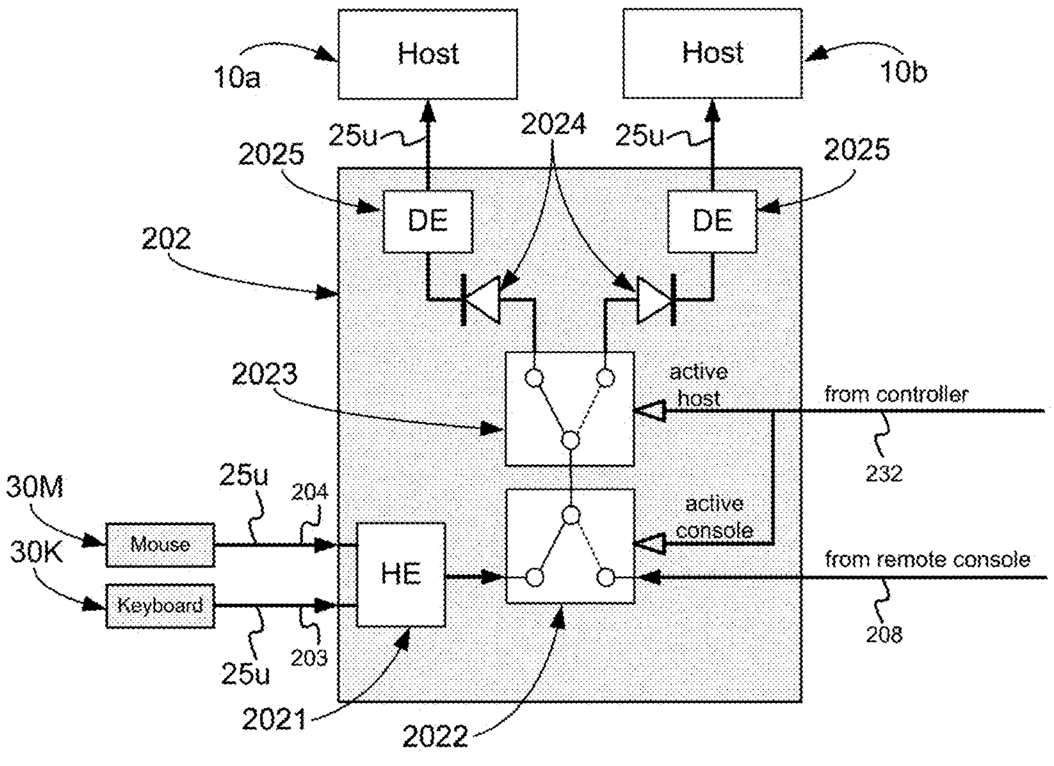

Reference is now made to FIG. 3. FIG. 3 is a simplified block diagram of KM unit 202. KM unit 202 comprises two USB data stream switches 2022 and 2023, host emulator 2021, two unidirectional enforcing elements 2024, and two device emulator 2025. The communication with keyboard 30K and mouse 30M is performed by the host emulator which behave as a host in front of keyboard 30K and mouse 30M and send the relevant data, the combined keyboard and mouse data, to switch 2022. When switch 2022 is passing through the host emulator 2021 data, this data will be targeted to the one of the two device emulators 2025. The path of the keyboard and mouse data pass through the unidirectional data flow enforcing elements 2024 to ensure that no data can be leaked from the active host to other hosts or to the secure KVM switch elements. The device emulators 2025 acts as a keyboard and mouse in front of the host and ensure continuous and smooth operation of the keyboard and mouse even when the host is not the active host, i.e., switch 2023 pass the keyboard and mouse data to the other host. In addition, KM unit 202 may receive a keyboard and mouse data from remote console subsystem 60 through connection 208. Conditioned upon proper command from the secure KVM switch controller 220, shown in FIG. 2 and provided via connection 232, this keyboard and mouse data is transferred to one of the two device emulators 2025 through switches 2022, 2023, and unidirectional data flow enforcing element 2024.

Figure 4:
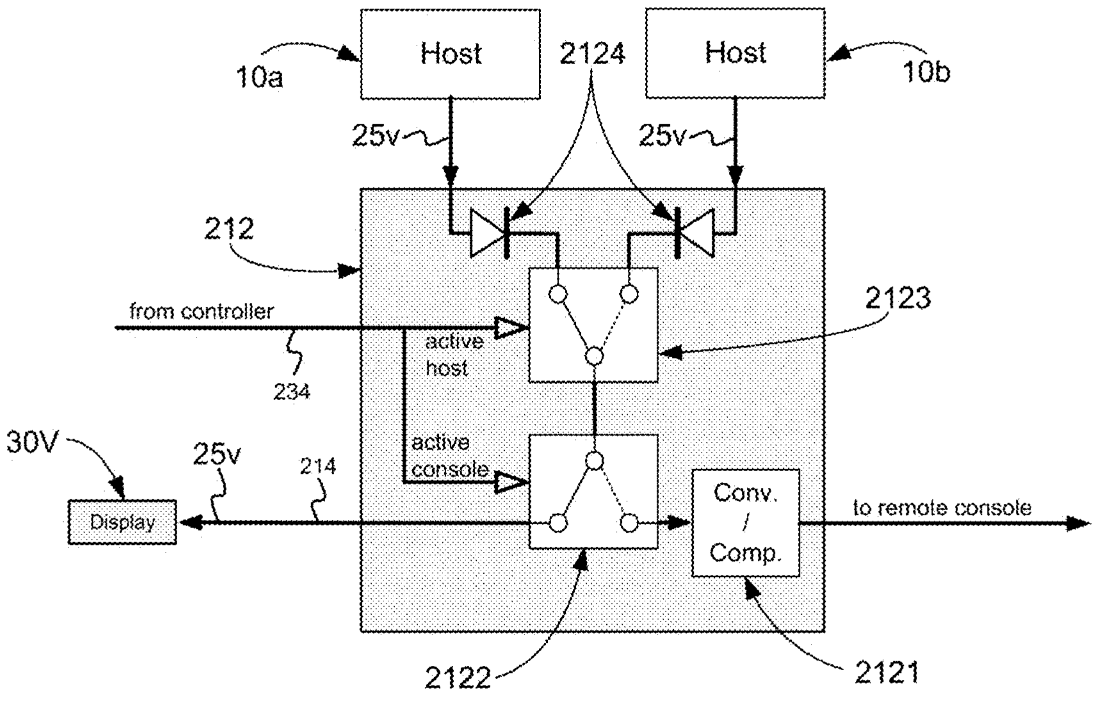

Reference is now made to FIG. 4. FIG. 4 is a simplified block diagram of video unit 212. Video unit 212 comprises two video data stream switches 2122 and 2123, two unidirectional data flow enforcing elements 2124, and video processor 2121. Switch 2123 transfers the video stream coming from the active host, either 10*a* or 10*b*, to switch 2122. Switch 2122 determines the direction that the video stream will be routed, either to display 30V in console 50 or to remote console subsystem 60. Optionally, if the video is routed to the remote console subsystem 60, the video may be converted to different video format by video processor 2121. The video stream may also be compressed and/or packetized to be in suitable format for transmission over remote console communication protocol 35.

The video stream data path passes through the unidirectional data flow enforcing element 2124 to ensure that no data can be leaked from the non-active host to other hosts or from the secure KVM switch elements. Conditioned upon proper command from the secure KVM switch controller 220, shown in FIG. 2 and provided via connection 234, the video stream from the active host is transferred to one of the two consoles, either 50 or 60, through video stream switches 2122, 2123.

In an exemplary embodiment of the invention, video unit 212 further comprises secure circuitries to provide secure plug and play operation. These circuitries may include DDC or EDID data stored in non-volatile memories in front of hosts 10 and may initiate a preliminary stage of reading the DDC or EDID data from display 30V and then storing the data to the non-volatile memories. Optionally, DDC or EDID data may be read from the display 63V of remote console 60 at remote console session initiation and storing this data to the non-volatile memories. Alternatively, the video unit 212 set the DDC or EDID data in the non-volatile memories with default video format and video unit 212 or remote console subsystem 60 converts the video stream to a video stream format supported by display 63V.

Figure 5:
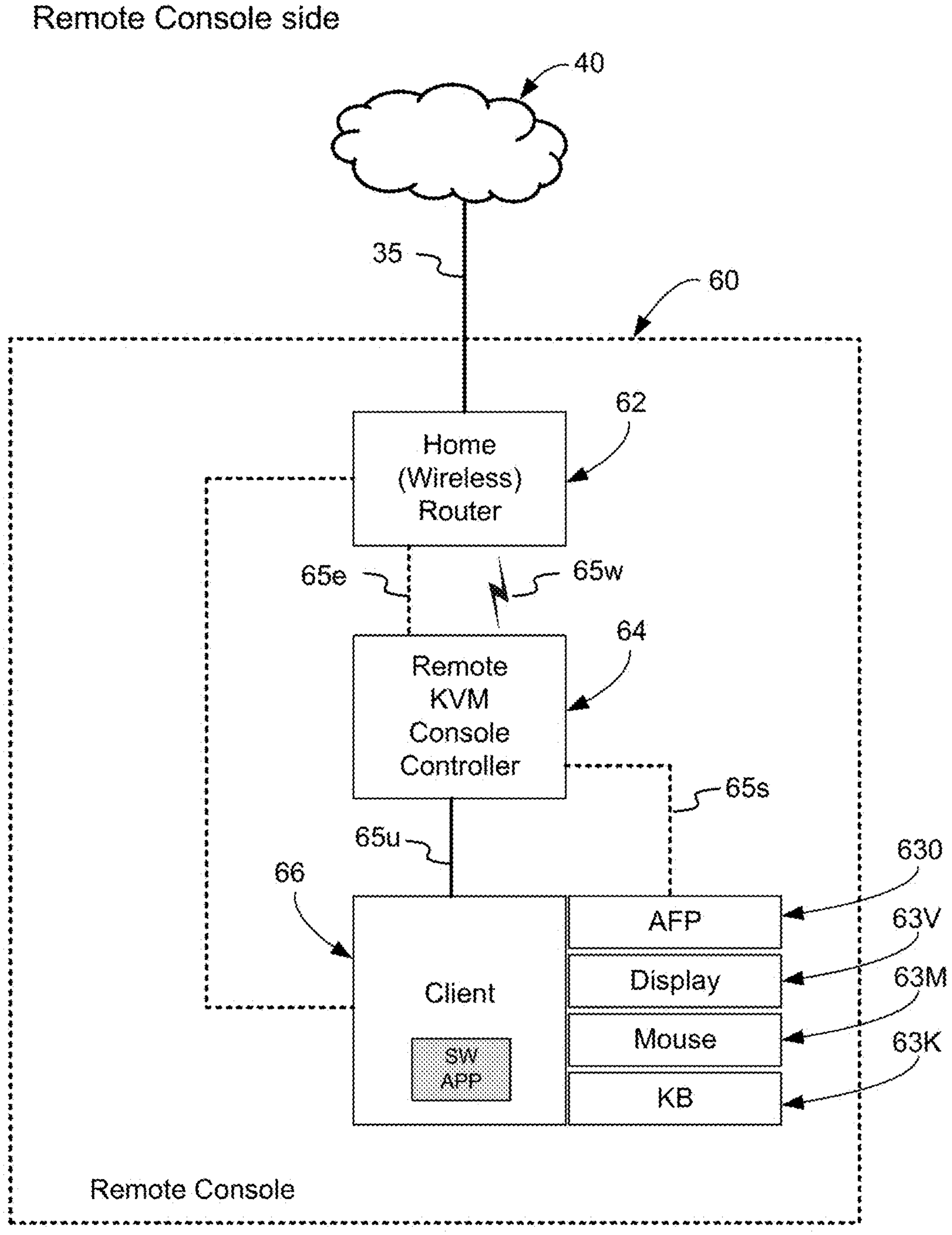

Focusing the attention now to the remote console side details. Reference is now made to FIG. 5. FIG. 5 is a simplified block diagram of the remote console side in accordance to an exemplary embodiment of the present invention. The bidirectional data stream between the remote console 60 and the secure peripheral sharing device, e.g., the secure KVM switch 20, is carried by remote console communication protocol 35 connected to a wide area network, e.g., the Internet 40. The remote console communication protocol 35 is connected to a home router 62. Home router 62 may provide communication services to other devices at the remote console location, e.g., a desktop home computer, by using wired remote console communication protocols 65*e*, such as, Ethernet, and/or by using wireless remote console communication protocols 65*w*, such as, Wi-Fi.

As used herein, the term "home router" means any apparatus that provides communication services to connects a home, or in general a location, to a wide area network (WAN), such as, the Internet. The home router may be referred also as, a modem, an access point, a router, a wireless router, a hub, a switch, a gateway, and the like, depend on the home router architecture, the communication protocol, and other (auxiliary) functions.

To enable the remote KVM console operation, the remote console subsystem 60 comprises a remote KVM console controller 64. The remote KVM console controller 64 communicates with the secure KVM switch 20 in the KVM switch side through the home router 62. Additionally or alternatively, remote KVM console controller 64 may have the ability to connect directly to the Internet. For example, remote KVM console controller 64 may comprise a cellular modem to connect the internet using a cellular network.

Remote KVM console controller 64 is connected to a client 66 using remote console communication protocols 65*u*, e.g., USB. Client 66 may be a desktop or laptop computer used for local, i.e., not remote, uses, such as, reading or writing documents. Client 66 may be connected directly to home router 62, for example, to browse the internet. Client 66 may also be a thin client or a zero client which are used only to connect to remote computing services. Client 66 may be integrated with remote KVM console controller 64 to become a single integrated device. Client 66 may be connected to a keyboard 63K, mouse 63M and display 63V. In some embodiments, e.g., wherein client 66 is a laptop device, the keyboard, the pointing device, e.g., a mouse, and the display are integrated in the client 66 (the laptop). In general, client 66 may run software applications, and in specific, client 66 may run a software application that performs the functions needed to provide the user the remote console services and functionality.

This software application, refer also as the remote KVM console application, performs at least the functions of: receives the video stream from remote KVM console controller 64 and send it to display 63V, receive the data from keyboard 63K and mouse 63M and send it to the remote KVM console controller 64.

In this exemplary embodiment, remote KVM console controller 64 is also responsible for all types of security management and enforcement of the remote console subsystem 60, including cryptography, authentication, and the like.

client 66 may perform many kinds of operations including controlling devices and interacting with the user as needed to provide the remote access to the active host running on the KVM switch side of the system. One such important operation is to select remotely the active host. This can be done by software user interface means, such as, presenting a menu on the display or by axillary device comprises push button keys to select the active host. Such a device is referred as Axiality Front Panel (AFP) 630. The AFP 630 may be connected or integrated to client 66. Optionally, AFP 630 may be connected to remote KVM console controller 64.

A typical home environment with remote console subsystem 60 is illustrated next.

Figure 6:
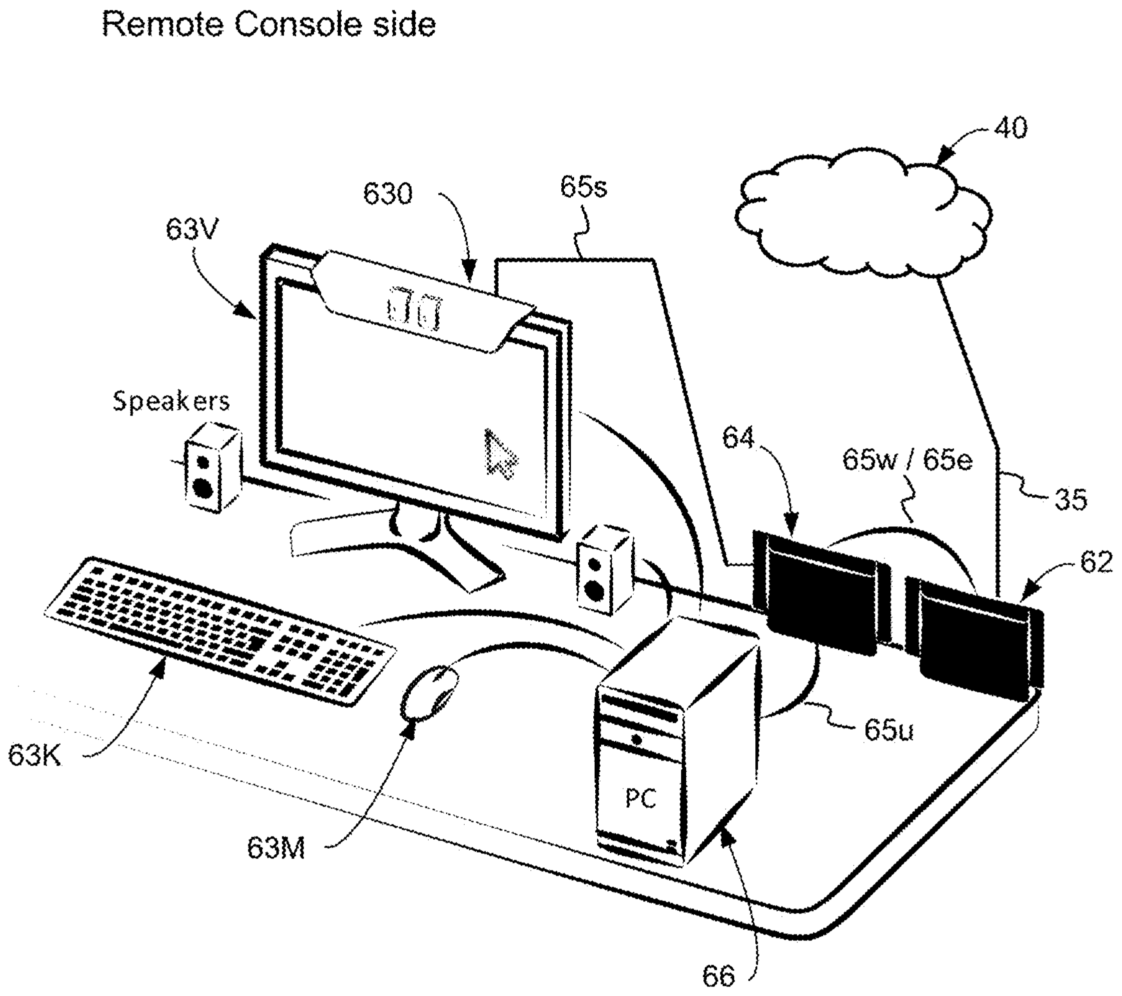

Reference is now made to FIG. 6. FIG. 6 is an isometrical view of a user's desk comprising the remote console side of the system in accordance with an exemplary embodiment of the present invention. Client 66 is a typical desktop personal computer (PC) connected to a keyboard 63K, a mouse 63K and a display 63V. The computing environment may have other peripheral devices, such as, speakers (shown in the figure), mic, cam, printer, and the like, (not shown in the figure). On the desk, there is also a home router 62 connected to the Internet. The home router 62 may provide access to the Internet for client 66 as well as other home devices, such as the user's cellular phone, using Wi-Fi. The home router 62 is also connected to remote KVM console controller 64 via protocols 65*w* (e.g., Wi-Fi) or 65*e* (e.g., Ethernet cable). Remote KVM console controller 64 is connected to client 66 via protocol 65*u*, e.g., USB. Remote KVM console controller 64 is also connected to AFP 630 via protocol 65*s*. Protocol 65*s* may be USB, RS232, SPI or the like. AFP 630 may be located, as shown in the figure, on top of display 63V, allowing the user of the remote console to easily access and switch the active host, 10*a* or 10*b*, by a single keypress on one of the buttons of AFP 630. As mentioned before, this embodiment configuration is only one possible alternative and many variations of client 66 form-factor, and integration or separations between devices 62, 64, 66 and 630 are possible in accordance with the present invention.

Figure 7:
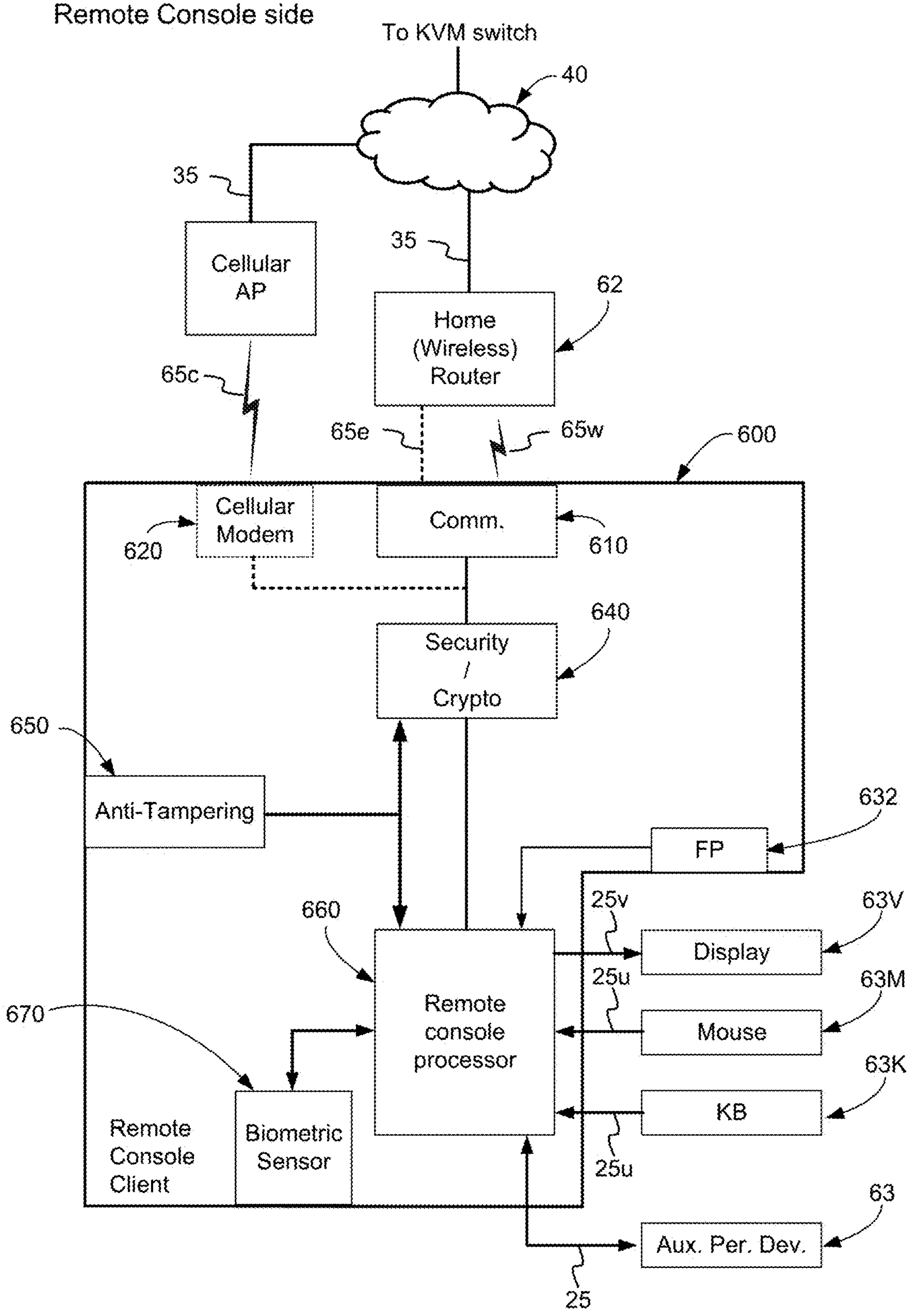

Reference is now made to FIG. 7. FIG. 7 is a simplified block diagram of another embodiment of remote console side. In this embodiment, remote KVM controller 64, client 66, and AFP 630, where integrated into a single remote console client 600 apparatus, that provides a full solution for remote access to the secure peripheral sharing device, e.g., secure KVM switch 20.

The remote console subsystem 60 comprises remote console client 600, the remote console's peripheral devices 63, 63K, 63V, 63M, and, optionally, also the home router 62. Cellular AP, shown as well in the figure, may be considered as part of the remote console subsystem 60 but preferably is considered part of the communication infrastructure between the remote console side and the KVM switch side.

Remote console client 600 may connect to the Internet 40 through, already deployed, home router 62 via wired 65*e* or wireless 65*w* communication protocol or directly via a cellular communication protocol 65*c*, e.g., 3G, 4G or 5G cellular standard, using built-in cellular modem 620. Cellular modem 620 may be connected to the Internet 40 through a cellular infrastructure, e.g., cellular access point (AP) or cellular base station (BS) deployed as a public infrastructure in proximity to the remote console location, e.g., on one of the rooftops of the buildings in the home's neighborhood. In the case where remote console client 600 is connected to the Internet 40 through home router 62, the communication services are provided by build-in communication modem 610. In any case, the data of remote console communication protocol 35 pass through the security/cryptographic unit 640 to provide the mandatory encryption/decryption and the optional authentication with the remote secure KVM switch 20. Remote console client 600 comprises a remote console processor 660 to perform all necessary tasks to provide the user the ability to work remotely with the active host connected to the remote secure KVM switch 20. Remote console client 600 may be a thin-client or a zero-client running over a low performance, reduced cost, microcontroller or even non-programmable hardware such as ASIC or FPGA. Alternatively, remote console client 600 may be a full capability computing device that can provide, in addition to remote console services to the KVM switch side, some local computing, data processing, gaming, and the like services. Remote console client 600 may be configured to be connected to a keyboard 63K. Additionally or alternatively, remote console client 600 may have integrated text entry, i.e., keyboard, capabilities. For example, remote console client 600 may have built-in mechanical keyboard, like in a laptop computer, or touch screen keyboard in the case where remote console client 600 is provided by a tablet form-factor.

Remote console client 600 may be configured to be connected to a mouse 63M or any other type of pointing device. Additionally or alternatively, remote console client 600 may have integrated pointing device. For example, remote console client 600 may have built-in touch pad for pointing, like in a laptop computer, or touch screen where the finger touch provides the pointing capabilities, in the case where remote console client 600 is provided by a tablet form-factor.

Remote console client 600 may be configured to be connected to a display 63V. Additionally or alternatively, remote console client 600 may have integrated display. For example, remote console client 600 may have built-in display, like in a laptop computer, or touch screen display in the case remote console client 600 is provided by a tablet form-factor.

The remote console processor 660 receives the video stream from security/cryptographic unit 640 and send the video stream in the proper format to the display. Optionally, remote console processor 660 performs video processing on the video stream. The video processing may be decoding, decompression, format adaptation and the like. Remote console processor 660 may read the DDC or EDID of display 63V and send it to the secure KVM switch.

Remote console processor 660 may receive the data from keyboard 63K and mouse 63M and send it to the security/cryptographic unit 640. Optionally, remote console processor 660 may comprise host emulator to emulate a host in front of the peripheral devices such as keyboard, mouse, display or any other peripheral devices. Typically, such a host emulator communicates with a matching device emulator in front of the host in the KVM switch side.

Security/cryptographic unit 640 is responsible for of security functions of the remote console client 600. Remote console client 600 may have anti-tampering unit 650, optionally battery operated, so that any attempt to open the remote console client 600 enclosure will make the device 600 non-functioning as well as erase all sensitive data including the cryptographic keys, firmware, as well as any other sensitive data reside in remote console client 600.

To provide trusted authentication, remote console client 600 may comprise biometric sensor 670 to authenticate not only the specific device 600 but also the user, i.e., the identity of the remote console operator. Biometric sensor 670 may be fingerprint reader, eye iris reader, face recognition sensor, or the like. Additionally or alternatively, instead of biometric sensor, other authentication means maybe used. For example, an identification card reader, e.g., CAC reader, smart card, smart dongle, one time password generator, and the like, may be used.

To select the active host, remote console client 600 may comprise front panel (FP) 632. FP 632 may comprise push buttons on the front side of the enclosure of remote console client 600. Additionally or alternatively, active host selection may be done by other means such as a menu over display 63V, shortcuts assigned to the keyboard 63K, mouse 63M gestures, and the like.

Remote console client 600 may be configured to be connected to an auxiliary peripheral device 63 via any type of peripheral devices communication protocols 25. Auxiliary peripheral device 63 may be a printer, a camera, a microphone, speakers, a smart card reader, a biometric sensor, an identification device, an external mass storage device, a USB dongle, a mobile terminal, such as, smartphone, and the like.

The auxiliary peripheral device 63 may be shared between hosts 10 by switching the connection to the active host, a.k.a., switching operation, or by simultaneous working with all hosts, a.k.a., simultaneous use operation. For example, smart cards, biometric sensors, cameras, microphones, printers and the like may be shared or switched. The setup and processing of simultaneous use operation is not in the focus of this document so the details on these embodiments are not provided herein, however the needed modifications are apparent to those skilled in the art.

The three essential peripherals: keyboard, mouse and display, are almost always operate in switching mode and the peripheral sharing device (or the KVM switch) that provides the switching operation for these essential peripherals, details are provided as a common baseline to be extended, as needed, with additional peripheral devices.

Figure 8:
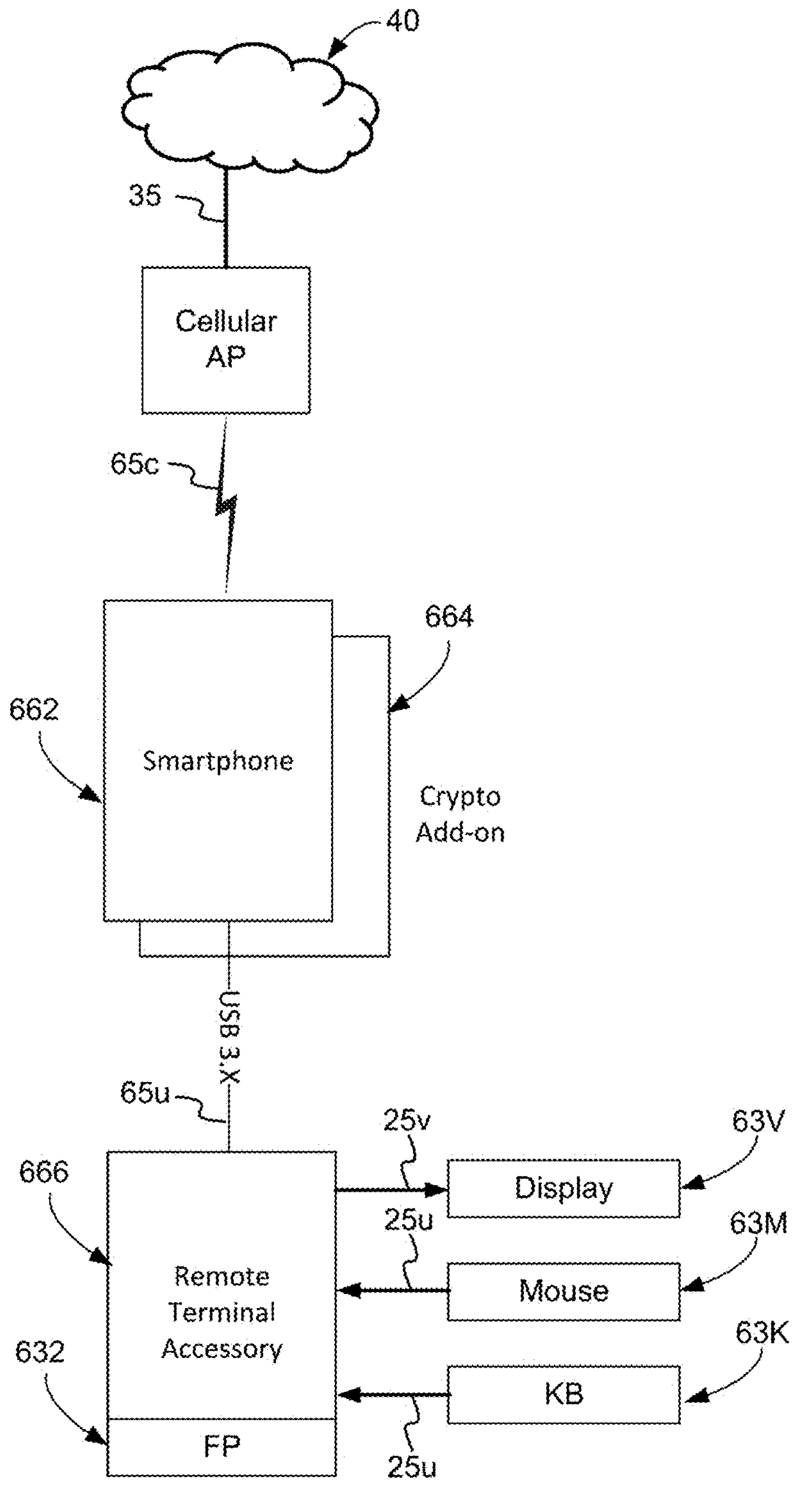

Reference is now made to FIG. 8. FIG. 8 is a simplified block diagram to yet another embodiment of the remote console side in accordance with some embodiments of the invention. The remote console subsystem 60 of this embodiment is based on a smartphone 662. Smartphone 662 is coupled with the KVM switch side via a cellular communication protocol 65*c*, e.g., 3G, 4G or 5G cellular standard. The cellular network comprises cellular AP that communicate with smartphone 662 via cellular communication protocol 65*c* and, in turn, via remote console communication protocol 35 over the Internet 40 to the secure KVM switch 20.

Smartphone 662 is connected to cryptographic add-on device 664. The cryptographic add-on device may be in the form of a jacket attached to smartphone 662. In an exemplary embodiment of the invention, add-on device 664 further comprises a cellular modem to enable add-on device 664 communicate directly via cellular communication protocol 65*c* instead of via smartphone 662. Such a configuration is considered more secure than the previous one but both options can be used depended on the security policy of the operating organization.

The video stream coming from the active host in the secure KVM switch side is processed (decompressed and decrypted) by Smartphone 662 and/or add-on device 664 and may be presented on the screen of Smartphone 662. Mouse may be implemented by capturing finger touches on a screen of smartphone 662. Keyboard may be implemented by virtual keyboard on the screen of smartphone 662. The mouse and keyboard data encrypted by add-on device 664 and multiplexed to a multiplexed data carried by remote console communication protocol 35. Active host selection may be provided by soft keys on the screen of smartphone 662 or hardware keys of the smartphone 662, e.g., the remote console application may use the volume control keys of the smartphone 662 to switch the active host. In an exemplary embodiment of the invention, the smartphone is replaced by a tablet.

The above remote console subsystem 60 configuration enables the user to operate the active host in the secure KVM switch side on the go (i.e., at mobile condition), however, in many cases, such operation is less comfortable. To provide more comfortable operation with smartphone 662, a remote console accessory 666 device may be provided. Remote console accessory 666 may be connected to smartphone 662 via remote console communication protocols 65*u*, e.g., USB 3.X. Remote console accessory 666 is configured to be connected via standard peripheral devices communication protocols 25 to standard console devices such as display 63V, mouse 63M and keyboard 63K. In an exemplary embodiment of the invention, display is connected via communication protocol 25*v*, e.g., HDMI, and mouse and keyboard via communication protocol 25*u*, e.g., USB.

In addition, remote console accessory 666 may comprise FP 632 to enable active host selection.

Remote console communication protocols 65*u* multiplexed the video data stream, after decryption, decompression and, optionally, additional video processing by smartphone 662 and/or add-on device 664, and keyboard, mouse and AFP data from remote console accessory 666.

In an exemplary embodiment of the invention, the functions of remote console accessory 666 are integrated into add-on device 664.

Figure 9:
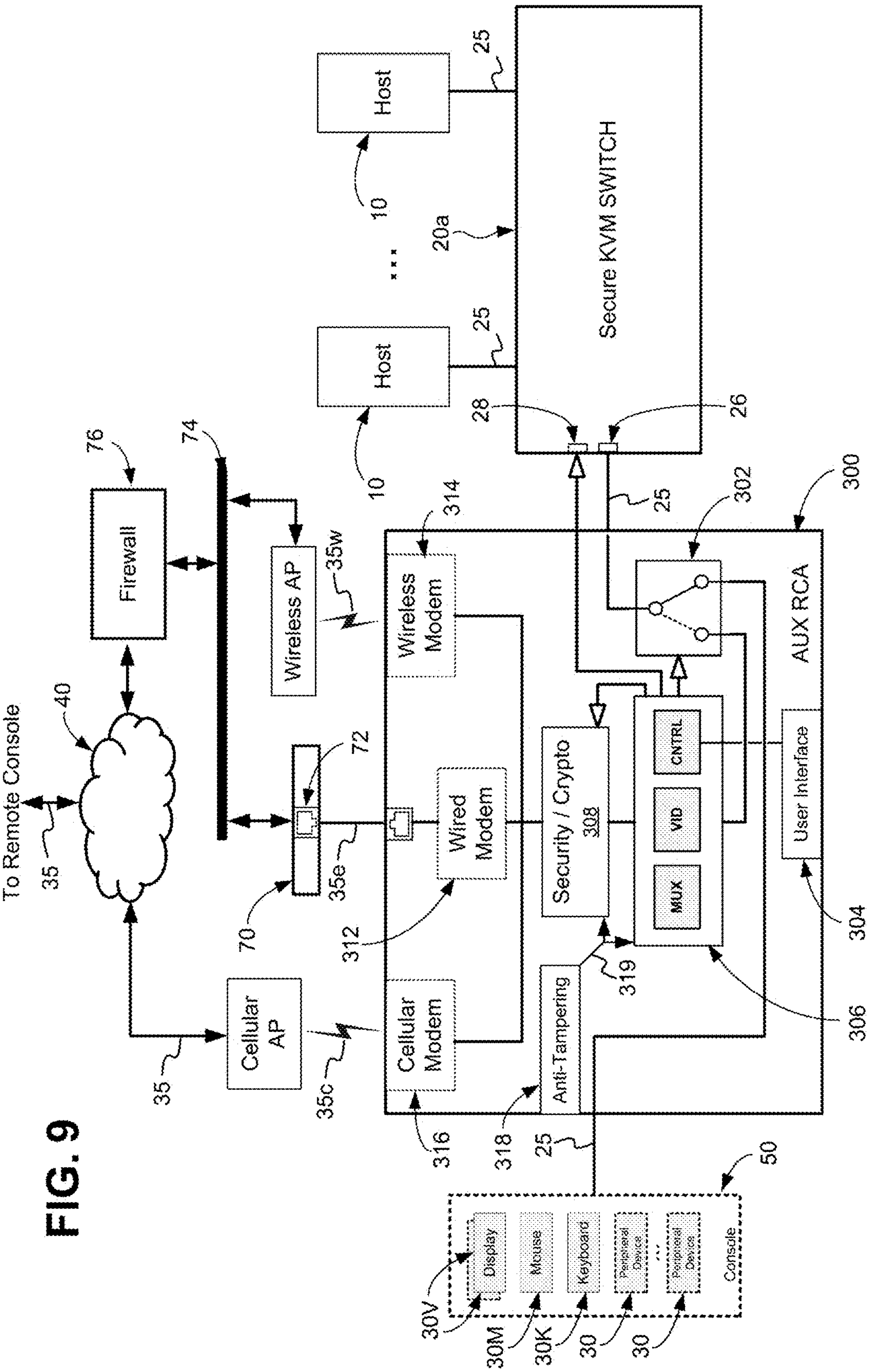

The attention is shifted back now to the secure KVM switch side. Reference is now made to FIG. 9. FIG. 9 is a simplified block diagram of another embodiment of the KVM switch side with an ordinary secure KVM switch 20*a* and auxiliary remote console adapter 300.

The ordinary secure KVM switch 20*a* is used alone when no remote console services are required. In order to add remote console function to the ordinary secure KVM switch 20*a*, the auxiliary remote console adapter 300 should be added.

The ordinary secure KVM switch 20*a* may be connected, in the regular fashion, directly to console 50 via peripheral devices communication protocols 25. The connection is performed via one or more ports 26. If remote console connection is desired, the auxiliary remote console adapter 300 is added to the system. In local mode, switch 302 connect console 50 to KVM switch 20*a* so that an ordinary KVM switch operation is performed between console 50 and secure KVM switch 20*a* and auxiliary remote console adapter 300 is a dumb transparent mediator between port 26 and console 50. To enable remote console operation, a switch for remote console mode in UI 304 may set to enable this mode. Additionally or alternatively, enable command to the controller in adaptor processing unit 306 may be provided from dedicated port or organization's local network 74. From security reason, in some embodiments this command may only be activated by equipment deployed directly on the internal network 74 of the organization. In an exemplary embodiment of the invention, there is a control office or control center that can enable and disable remote access for all or some of the peripheral sharing devices of the organization. For such a setting, the user may call the control center for identification, and the control center operator enables the remote connection, optionally, for a limited duration.

As soon as the remote KVM switch console mode is enabled, either the remote console side or the KVM switch side may initiate a remote console connection, referred also as a remote console session. Establishing a session may have several types of authentication steps.

One type of authentication step may involve the identity of hardware devices, referred herein as hardware ID authentication. In hardware ID authentication, a remote console session between only a specific pair of devices may be able to be established. For example, if an employee has auxiliary remote console adapter 300 with serial number #SN1 in his office, and in his home, a remote console client 600 with serial number #SN2, then one possible security policy may be to allow only connection between device with #SN1 and device with #SN2. Optionally, there is an IT level equipment or IT personal that can enable remote connection with all or some of the KVM switches in the organization. In an exemplary embodiment of the invention, other type of authentication scheme and other type of authentication may be used. For example, personal authentication with biometric sensor, smart card or any other means of personal authentication may be used.

In an exemplary embodiment of the invention, the authentication process may be two steps authentication or multi-factor authentication or any other type of authentication as defined by the security policy of the operating organization.

After the remote console session is established, adaptor processing unit 306 switches the connection from local console 50 to remote console 60. This is done by changing switch 302 state to connect the console port 26 with adaptor processing unit 306. The active host in this remote console mode is seamlessly get in contact with the remote console 60. The video stream of the active host is processed by the video unit of adaptor processing unit 306, encrypted by security/cryptographic unit 308 and sent out using one of three communication link options.

The first communication link option is communicating using wired modem 312 which is connected, for example similar to the configuration described in FIG. 2, via Ethernet port 72.

The second communication link option, is communicating using wireless modem 314. Wireless modem 314 is connected to wireless access point 78 using wireless remote console communication protocols 35*w*, such as, Wi-Fi. Wireless access point 78 is connected to organization's local network 74 that, in turn, connected to firewall 76 as in the embodiment described in FIG. 2.

The third communication link option is communicating using cellular modem 316. Cellular modem 316 is connected a cellular AP, also in some cellular system referred also as a cellular base station (BS), and from the cellular AP the video stream is carried over the cellular infrastructure to the Internet 40.

It should be noted that in the same communication link, the remote console communication protocol 35, all other data needed for establishing the remote console session is transported. Obviously, remote console communication protocol 35 is typically multiplexed with other types of data communication on the same communication infrastructure.

To provide the other facilities of the remote console operation the MUX in adaptor processing unit 306 takes care of the keyboard and mouse data that are send from remote console subsystem 60 and after decryption by security/cryptographic unit 308, this data is adapted to the proper peripheral devices communication protocol 25 and is sent via the switch 302 to port 26. Active host 10 seamlessly continue to work with the keyboard 63K and the mouse 63M of remote console 60 instead of with the local console 50.

When an active host switching command is received from remote console 60 to auxiliary remote console adapter 300 via remote console communication protocol 35, the command is detected, separated and interpreted by mux unit of adaptor processing unit 306 and the controller of adaptor processing unit 306. The controller sends the selection command to the KVM switch 20*a* via port 28. Port 28 may be an existing AFP input port of KVM switch 20*a*.

Optionally, since auxiliary remote console adapter 300 may comprise a military grade cryptographic unit, it is desired to have anti-tampering unit 318 that erase all keys and sensitive data from auxiliary remote console adapter 300. In any attempt to open the auxiliary remote console adapter 300 enclosure, lines 319 activate the anti-tampering erase function in security/cryptographic unit 308 and adaptor processing unit 306. Optionally, erase of any or all keys and sensitive data may be provided by user interface 304. To eliminate the chance of accidental activation for this function, user interface operations like simultaneous press of several buttons, prolonged presses, sequence of presses, and the like may be used.

In an exemplary embodiment of the invention, user interface 304 may comprise a push button to restore auxiliary remote console adapter 300 to its default configuration.

In an exemplary embodiment of the invention, user interface 304 may comprise a push button to reset auxiliary remote console adapter 300.

In an exemplary embodiment of the invention, user interface 304 may include indications that indicates that remote console mode is enabled, as well as an indication that the auxiliary remote console adapter 300 is in remote console session.

Figure 10:
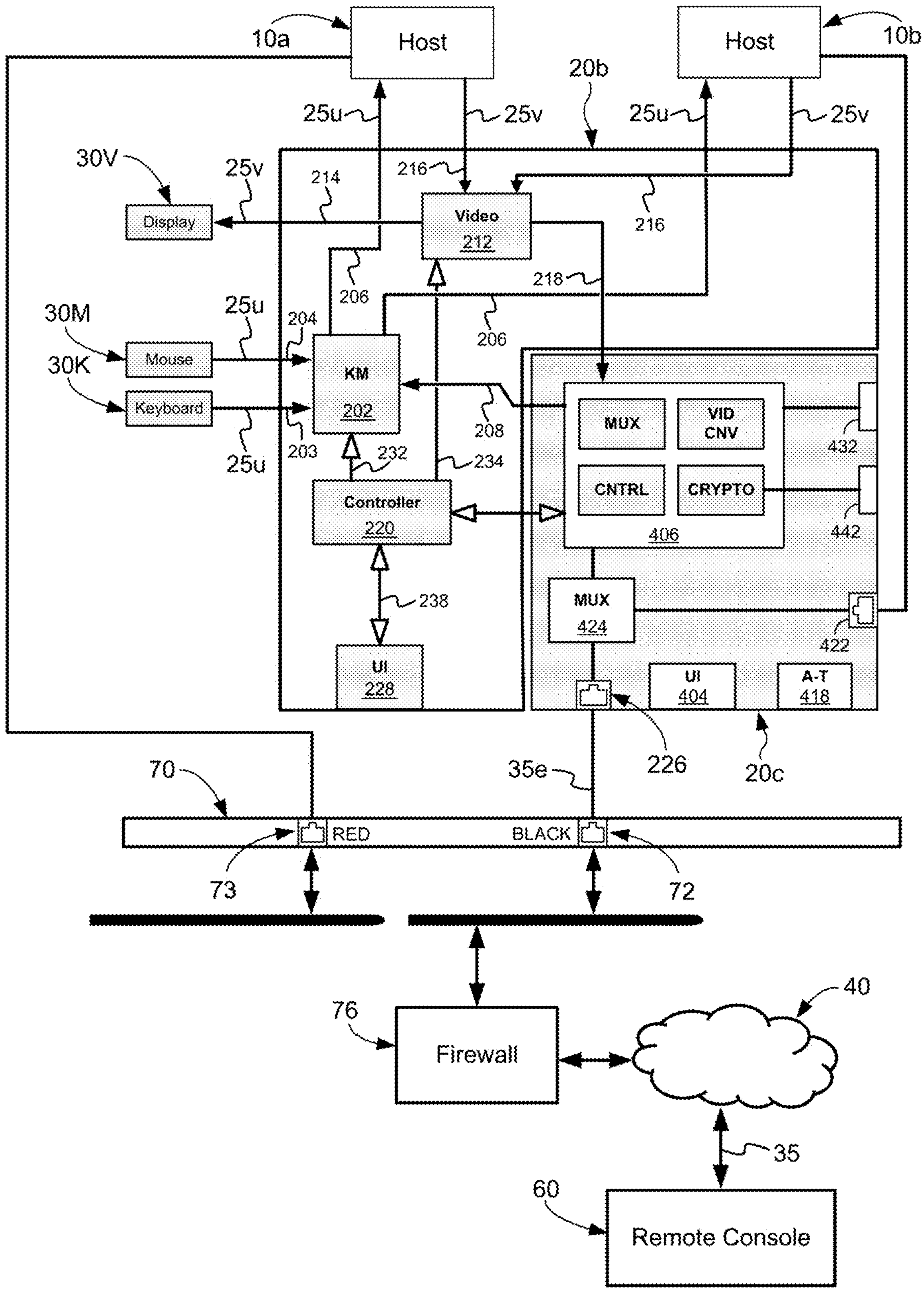

Reference is now made to FIG. 10. FIG. 10 is a simplified block diagram of another embodiment for implementing the KVM switch side of the system. In the embodiment of FIG. 10 the secured KVM switch 20 of FIG. 2 is partitioned to a basic secure KVM switch 20*b* and add-on adapter 20*c* that extend the KVM switch capabilities to support a remote console 60. The difference from previous embodiment of FIG. 9 is that in FIG. 9 embodiment ordinary secure KVM switch 20*a* was not designed or had any provisions to support remote console subsystem 60 while basic secure KVM switch 20*b* was designed to support remote console subsystem 60 with add-on adapter 20*c*.

Add-on adapter 20*c* and basic secure KVM switch 20*b* are configured to match each other and have a proper interface, i.e., one or more connectors that match and provide all mechanic and electric connectivity properties that are needed to co-work together. The matching form-factor may be an enclosure extension form-factor of the basic secure KVM switch 20*b* from one side of the basic secure KVM switch 20*b* enclosure or a bay form-factor, wherein add-on adapter 20*c* fits inside the bay of basic secure KVM switch 20*b*.

Console device 30K, 30M and 30V as well as hosts 10*a* and 10*b* are connected directly to the secure KVM switch 20*b* in similar to the way shown in FIG. 2. The KM unit 202, the video unit 212, UI 228, Ethernet type remote console port 226, and controller 220 are also similar to the ones described in secure KVM switch 20 of FIG. 2 and they are configured to have the capabilities needed to connect to a remote console 60.

Similar to, mux 222 and security 224 of secure KVM switch 20 shown in FIG. 2 and to security/cryptographic unit 308 and adaptor processing unit 306 of auxiliary remote console adapter 300 shown in FIG. 9, processing unit 406 of add-on adapter 20*c* provides all the remote console functions describe in the units specified hereinabove. Similarly, user interface 404 and anti-tampering 418 provide similar functions as user interface 304 and anti-tampering 318 in FIG. 9.

In addition to the functions described hereinabove, Add-on adapter 20*c* comprises port 432 that is configured to enable tunnelling of additional information or to securely connect additional devices between the KVM switch side and the remote console side. Furthermore, add-on adapter 20*c* comprises port 442 for key management of cryptographic unit of processing unit 406.

In a typical office of many organizations, the office wall 70 comprises only two Ethernet sockets, the first Ethernet socket is for an unclassified (black) network 72, and the second Ethernet socket is for a classified (red) network 73. Secure KVM switch 20*b* in FIG. 10 support two hosts: 10*a* and 10*b*. The classified host 10*a* is connected directly to Ethernet socket for the classified (red) network 73. If we connect host 10*b* to the Ethernet sockets for the unclassified (black) network 72, and want to have also a connection to the remote console 60 we would need another Ethernet socket in the office wall or need to deploy additional Ethernet router in the office. To avoid this additional infrastructure requirement, add-on adapter 20*c* comprises port 422, e.g., Ethernet socket, that is connected to a built-in internal MUX 424. MUX 424 may be Ethernet router, Ethernet switch, hub or any circuitry that aggregate the communication from processing unit 406 and port 422 to remote console port 226. Remote console port 226 communicate with the non-classified network of the organization and, in turn, further connected to the Internet 40 and to remote console 60. Having MUX 424 in Add-on adapter 20*c* enables connecting host 10*b* to port 422 as shown in the figure, so that host 10*b* may be connected to the internet while the KVM switch (20*b* and 20*c*) simultaneously may be connected to the remote console 60 through the same Ethernet communication protocol via the unclassified (black) network 72.

Figure 11:
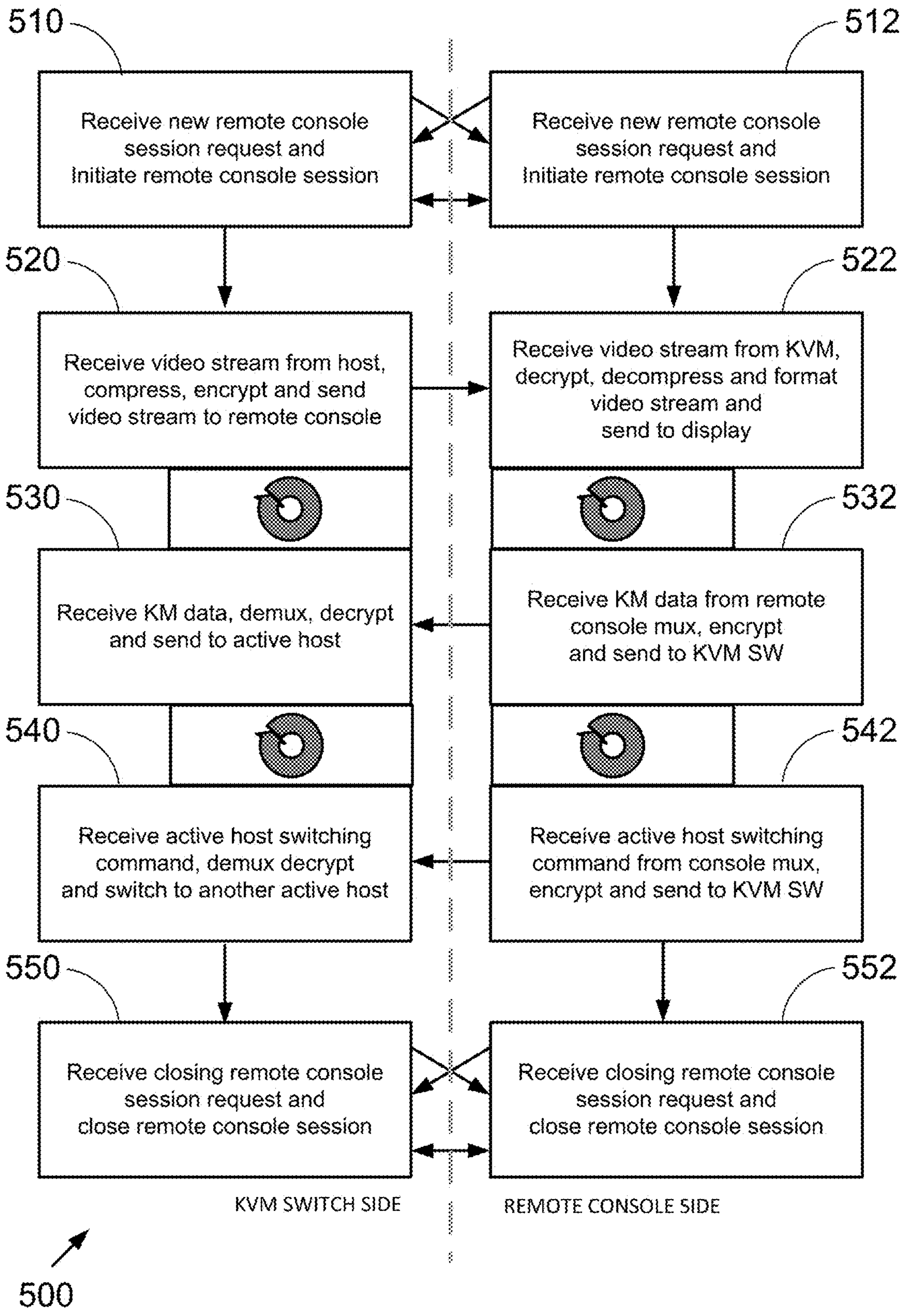

Reference is now made to FIG. 11. FIG. 11 is a conceptual simplified flow diagram of the method 500 implemented by the KVM switch side and remote console side devices. In the Figure, the steps performed in the remote console side are shown in the right side of the figure and the steps performed in the KVM switch side are shown in the left side of the figure. The method starts when in any of the sides a triggered to start remote console session is received. This can be by enabling the remote console mode to the KVM switch, i.e., 20, 20*a*+300, 20*b*+20*c*, or initiating a remote console session by the user in the console side devices, i.e., 60, 64, 66, 600, 660, 662, 664, 666. If the trigger starts in the remote console side, step 512 triggers step 510 in the KVM switch side, and vice versa, if the trigger starts in the KVM switch side, step 510 triggers step 512 in the remote console side. When all security conditions are met, i.e., the KVM switch is allowed to enter remote console mode, the console side is active and request to work with the KVM switch and all authentication processes are accomplished, remote console session is imitated, the method 500 progress to steps 520, 530 and 540 in the KVM switch side and to steps 522, 532 and 542 in remote console side. Steps 520, 530 and 540 are running concurrently and in infinite loop as indicated by the circular arrows in the figure. Similarly, steps 522, 532 and 542 are running concurrently and in infinite loop as well. The execution of these steps is stopped when a request for closing the remote session is received in any of the sides. For example, a closing request may occur in the KVM switch side when the session duration is expired. A closing request may occur in the remote console side when the user of the remote console finish his work on the remote console. Many other events may trigger a session closing request, for example, if a monitoring subsystem suspect a malicious activity or if the console user do not use the console for a predefined period, a remote console session closing request may be triggered.

During active session, step 520 receives the video stream (or, in general, the one or more video streams, if more than a single display is supported) from the active host, e.g., 10*a* or 10*b*, via peripheral devices communication protocols 25, or in specific, peripheral devices communication protocols 25*v*. For example, peripheral devices communication protocols 25*v* may be HDMI. To provide lower delay in the transport of the video stream, the video stream may be compressed, optionally sliced to packets, e.g., IP packets, and then encrypted and send to remote console via remote console communication protocol 35. This video stream is received by step 522 and then decrypted, decompressed and adapted to the remote console display format, e.g., back to HDMI, or alternatively converted to DVI. The video stream output of step 522 is sent to display 63V via peripheral devices communication protocols 25, or in specific, peripheral devices communication protocols 25*v*.

During active session, step 532 receives data from keyboard 63K and mouse 63M or any other text entry devices and pointing devices reside in the remote console side, encrypt this data and multiplexed and send this data via the remote console communication protocol 35. In step 530 this data demultiplexed, decrypt and send in the proper format, e.g., as USB HID device over a USB bus, to the active host.

During active session, step 542 receives active host switching command initiated using AFP 630, FP 632 or any other means used by the remote console devices, encrypt this data and multiplexed and send this data via the remote console communication protocol 35. In step 540 this data demultiplexed, decrypt and processed by the proper controller in the KVM switch side and then switch the active host as commanded.

In an exemplary embodiment of the invention, method 500 for providing a remote console subsystem 60 to a secure peripheral sharing device 20 is disclosed. The secure peripheral sharing device comprises: a plurality of ports to be configured to be connected to a plurality of hosts 10; a port to be configured to be connected to a console 50 comprising at least a first keyboard 30K, a first mouse 30M and a first display 30V; and a remote console port 22 configured to be coupled to a remote console subsystem. The remote console subsystem 60 comprises: a port configured to be coupled to a secure peripheral sharing device 20; and a remote console comprising at least a second keyboard 63K, a second mouse 63M and a second display 63V.

The method 500 comprises the step of:

receiving requests for open new remote console sessions and upon such request open a remote console session in both the side of the secure peripheral sharing device and the remote console subsystem (510, 512), as long as the remote session is active, continuously perform the steps of:

receiving video stream from the active host and transferring the video stream to the second display (520, 522)

receiving a keyboard and mouse data from the second keyboard and the second mouse and transferring the keyboard and mouse data to the active host (530, 532), and upon receiving active host switching commands from a user, switching the active host (540, 542), receiving requests for close remote console sessions and upon such request close the remote console session and resume working of active host with the console (550, 552).

While this high-level flowchart describes the basic flow of the remote console operation, it would be apparent to those skilled in the art to how to make modifications and additional steps, such as, to support additional peripheral devices in the remote console, to provide additional means of security, to convert formats as needed, to accelerate system latencies, and the like.

The delay between user action on the console and the response might become an issue if the delay in remote console communication protocol 35 becomes higher than few hundreds of milliseconds. To reduce this latency, several measures may be taken: (a) reducing video bandwidth by lower the video quality, (b) reducing video bandwidth by higher rate of video compression, (c) reducing the latency of processing elements such as video compression, video decompression, encryption/decryption and the like, (d) reducing the latency of communication by reducing the number of communication device in the link, and (e) reducing the latency of communication by having higher quality communication links, higher quality of service (QOS) links, and low latency communication links, for example using 5G cellular network in both the remote console side and the KVM switch side.

In an exemplary embodiment of the invention, other means are used to improve the latency, for example, various technics of processing the mouse data such as to predict its future location, to manipulate click time and the like may be used. In addition, remote console software might be installed in the hosts to provide deeper understanding and processing of the video stream. For example, this software might give priority to the active window, priority to parts in the video frame that are updating text entry information, active area that are affected by mouse hover or mouse clicks, and the like. This software might communicate with a remote console side software via another side channel that is multiplexed on the keyboard and mouse USB connection.

Figure 12:
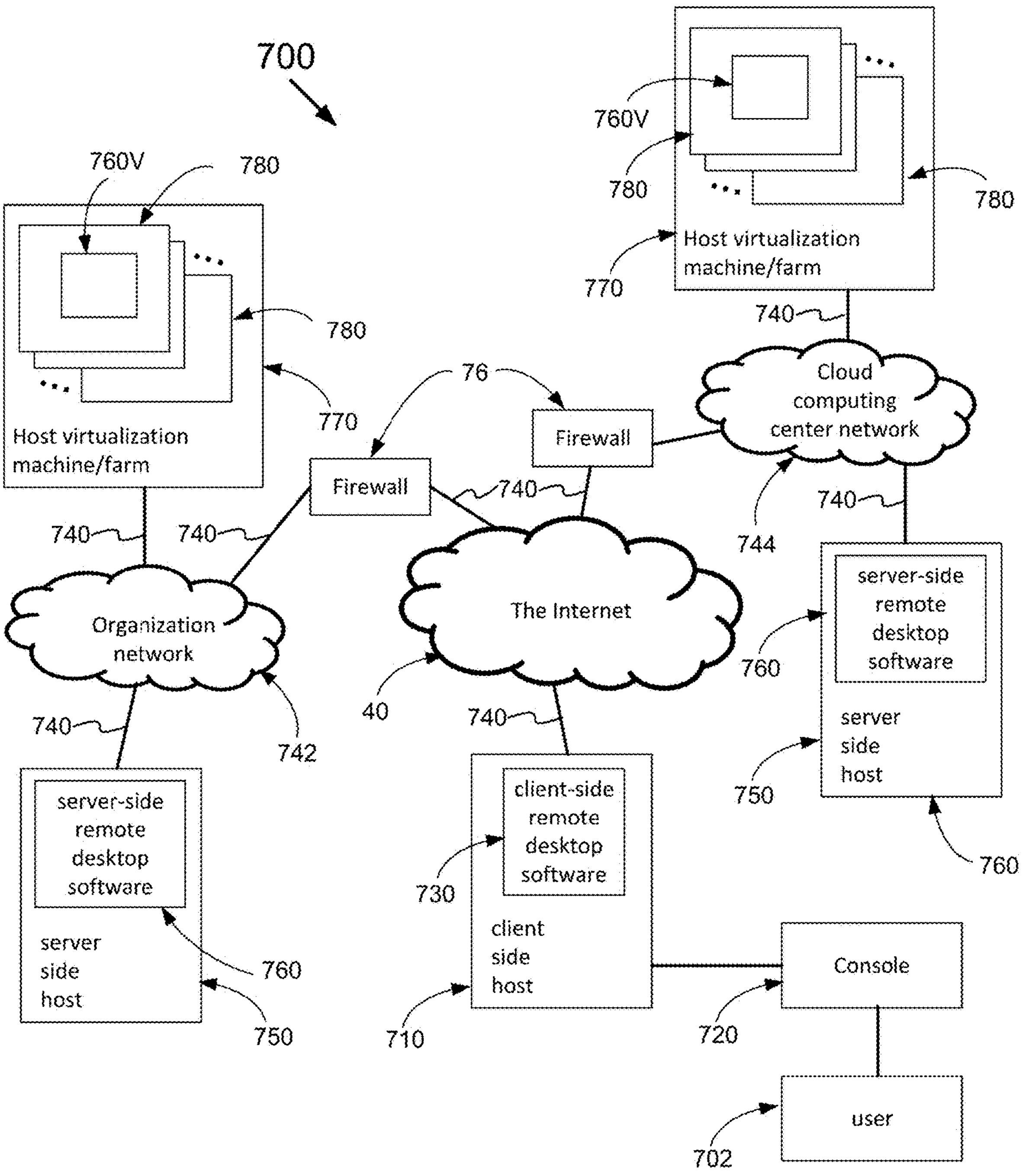

While the above embodiments teach remote console using a KVM device reside in the organization premises, there are many organizations that are not using KVM at offices and their work from home solution is a software-based remote desktop solution that is illustrated in FIG. 12. FIG. 12 is a simplified block diagram of a remote desktop system. System 700 comprises a plurality of users 702 working at home, or anywhere out of their offices, using client-side host 710. Client host 710 may be desktop computer, laptop computer, notebook computer, tablet, PDA, smartphone, thick/thin/zero client or any other computing system with UI the user can use for accessing remote host. Client-side host 710 may have console 720 for interaction between the user and the host. A typical console for desktop computer may be a keyboard, a mouse (or any other pointing device) and display. In some embodiments, part of the console is integrated into the client-side host 710, e.g., the keyboard in a laptop computer. In other examples, the full console is integrated in the client-side host 710, e.g., a smartphone comprising a display, a keyboard and a pointing device where all these console devices are integrated into the smartphone and implemented over the touch screen display element. Many hybrid configurations of console 720 and host 710 may exist in practice. For example, a docking station may connect to typical desktop environment console devices, such as, a keyboard, a mouse and a desktop display to a smartphone that already comprises integrated console in order to improve the user interface productivity.

Client-side host 710 comprises client-side remote desktop software 730. The client-side remote desktop software 730 captures the mouse and the keyboard (or in general, the user inputs) data from client-side host 710 and sends these inputs to a server-side host 750. The server-side host 750 comprises server-side remote desktop software 760 that receive the user inputs data and use the user input data to control server-side host 750 as if it was controlled by a user which is operating a local console. The display (or in general the user output) of server-side host 750 are sent by server-side remote desktop software 760, in turn, to the client side.

In an exemplary embodiment of the invention, user input may further comprise audio input (for example from a microphone), video stream (for example, from video camera-cam), other data from console input device (e.g., biometric authentication sensors), and the like The communication between client-side remote desktop software 730 and server-side remote desktop software 760 is provided by a remote desktop protocol (RDP). Many versions of Remote Desktop Protocols exit and they may communicate over many types of communication links 740. For example, one of the most prominent remote desktop solutions in the market is Microsoft solution wherein the client-side remote desktop software 730 is referred as "remote desktop connection" or "terminal services client", the server-side remote desktop software 760 is referred as "remote desktop server (RDS)" and the communication protocol is referred as "Remote Desktop Protocol". Note that the "Microsoft remote desktop protocol" is a specific type of the general term RDP for the protocol and unless specifically mentioned in the document the term remote desktop protocol (RDP) is referred to any protocol for remote desktop solution. For example, RDP may mean, (1) Apple Remote Desktop Protocol (ARD)—by Apple, (2) Independent Computing Architecture (ICA)—by Citrix Systems, (3) Appliance Link Protocol (ALP)—by Sun Microsystems, (4) HP Remote Graphics Software (RGS)—by Hewlett-Packard, (5) Remote Desktop Protocol (RDP)—by Microsoft, and the like.

The RDP protocol may communicate over many variants of communication links 740, the most common is IP protocol over Ethernet. Microsoft's RDP is typically run over IP and the server-side remote desktop software 760 listens on TCP port 3389 and UDP port 3389. Other communication links like optical and wireless communication links may be used as well.

Regarding the remote desktop software 730 and 760, there is also many software available in the market such as freeRDP, rdesktop, LogMeIn, Anydesk, Apple remote desktop, GoToMyPC and XenApp from Citrix, PCanywhere, xrdb, and many more.

It should be mentioned that remote desktop solution provides a good way for cross platform operation so while the server-side remote desktop software 760 may run for example on Linux, the client-side remote desktop software 730 may run, for example, on Microsoft Windows. The above listed software may enable to run remotely (and sometimes also locally) software of almost any computing platform using any other computer platform.

Remote desktop solutions are also known as "desktop virtualization". Remote desktop solutions are usually used in combination with another virtualization concept of virtual machines or hosts farms 770. A plurality of virtual hosts 780 instances may reside inside virtualization machines/farms 670 sharing the same hardware to create a plurality of virtual host 780. Each virtual host 780 can have a server-side remote desktop software 760V that runs an instance of the server-side remote desktop software 760.

User 702 of client-side remote desktop software 730 may access (and operate) a host 750 located remotely in his office using a data path that starts from the Internet 40, through firewall 76 that communicate with organization network 742 (e.g., a local network) and ends in the server-side host 750. Similarly, user 702 may access (and operate) a host located in a computing center on the cloud, i.e., host 750 that resides in cloud computing center and connected to the internet through cloud computing center network 744. Furthermore, user 702 may access a virtual host instantiates 780 on a virtualization machines/farm 770. Virtual host instantiates 780 may reside either on the organization network 742 or the cloud computing center network 744.

While this remote desktop solution is very convenient and flexible, such remote desktop solutions are known to have cyber security vulnerabilities, while some can be addressed using software means (such as firewalls, authentication, DMZ zones, and other cyber security tools that may be customized for remote desktop software solution, software based cyber security measures are generally not secure enough to many organizations. Furthermore, in some cases the organization would like to give access to hosts that reside on isolated network, i.e., network that is not connected to the internet for workers at home or on-the-move. A solution for more secure access to such hosts, without using a KVM as disclosed above, is disclosed next.

FIG. 13 is a conceptual remote desktop solution system 800 using a remote desktop isolator 810. As in previous case, user 702 may access (and operate) host 750 located in his office or elsewhere in the organization premises and connected to organization network 742. In some embodiment, network 742 is isolated and not connected to the Internet 40. Whenever the organization network is isolated network, i.e., not connected to the Internet 40, there is no other way to support remote desktop solution other than using remote desktop isolator 810. Remote desktop isolator 810 is a device that securely bridge between the internet 40 and organization network 742 for remote desktop access solution. Remote desktop isolator 810 is more cyber secure solution and the isolator mission is to allow cyber secure use of remote desktop access to host 750.

In an exemplary embodiment of the invention, a firewall 76 is provided between internet 40 and organization network 742, however, in this case, firewall 76 may block the access of remote desktop services and if remote desktop services are provided, they will be performed only through remote desktop isolator 810. It should be noted that having a firewall reduce the cyber security of the organization and typically such solution would be selected for less classified networks.

Remote desktop isolator 810 comprises three major zones, or layers: client-side desktop isolator layer 820, isolator layer 830 and server-side desktop isolator layer 840. Client-side desktop isolator layer 820 is connected to the client-side host 710 via communication link that provide RDP communication services with the client-side remote desktop software. For example, client-side desktop isolator may comprise Ethernet port that is connected to Ethernet network that is connected to the Internet 40. Client-side desktop isolator layer 820 may comprises processor and software (or firmware) that run server-side remote desktop software that act as a remote desktop server proxy for the client-side remote desktop software 730 that user 702 interacts with. In an exemplary embodiment of the invention, the RDP communication on the Internet 40 is protected by encrypted communication tunnels, e.g., a Virtual Private Network (VPN) using SSL, SSH or the like.

server-side desktop isolator layer 840 is connected to the server-side host 750 via communication link that provide RDP communication services with the client-side remote desktop software. For example, client-side desktop isolator comprises Ethernet port that is connected to Ethernet network that is part of the organization network 742. Server-side desktop isolator layer 840 may comprise processor and software (or firmware) that run client-side remote desktop software that act as a remote desktop server proxy for the server-side remote desktop software 760. In an exemplary embodiment of the invention, the RDP communication over the organization network is protected encrypted communication tunnels e.g., Virtual Private Network (VPN) by using SSL, SSH or the like.

Between client-side desktop isolator layer 820 and server-side desktop isolator layer 840 there is an isolation layer 830 that contains special hardware to enforce that only valid information flow will be transferred between client-side remote desktop software 730 and server-side remote desktop software 760. A more detailed view of the isolator layers will be disclosed next.

In an exemplary embodiment of the invention, a computing system having remote desktop capabilities is disclosed. The system comprising: one or more server-side hosts; one or more client-side hosts comprising a console comprising at least a first keyboard, a first mouse and a first display; and one or more remote desktop isolators, wherein each of the remote desktop isolator comprises: client-side desktop isolator layer, isolator layer, and server-side desktop isolator layer, the client-side desktop isolator layer is connected to one of the one or more client-side hosts via communication link providing RDP communication services, the server-side desktop isolator layer is connected to the one of the one or more server-side hosts via communication link providing RDP communication services, at least one of the above communicating pairs of server-side host and client-side host that communicate using the RDP protocol with each other are exclusively able to communicate using the RDP protocol through one of the one or more remote desktop isolators, and the isolation layer of each one of the one or more remote desktop isolators enforces a data flow of only a raw data information from or to client-side peripheral devices of the console of the client-side hosts in order to reduce the risks of cyberattacks performed through the RDP protocol.

FIG. 14 is a conceptual block of the remote desktop isolator 810. Remote desktop isolator 810 comprises client-side interface 822 that communicate RDP using communication link 740C. The interface may be Ethernet, Optical link or any link that is used to connect devices and hosts to a network. The client-side interface 822 should be able to connect via the communication link 740C to the client-side host 710. Client-side interface 822 is internally connected to a client-side isolator processor 824. The client-side isolator processor 824 may be any processor, host, circuitry, FPGA, or computer that is able to perform the function of a client-side remote desktop isolator software. In an exemplary embodiment of the invention, the client-side isolator processor 824 may be implemented by a standard X86 microprocessor architecture and running Microsoft windows operating system, or may be ARM based architecture running Linux operating system or the like. The processor architecture may be associated to thin/thick/zero client architectures. The client-side isolator processor 824 execute the client-side remote desktop isolator software 826. The client-side remote desktop isolator software 826 may act as a proxy for server-side version of a remote desktop software. This software may be a special version of an off-the-shelf software, such as remote desktop server (RDS) from Microsoft, or any other server-side version of remote desktop software, from Apple, Citrix, HP, or the like. It should be noted that the client-side remote desktop software 730 should be compatible with the client-side remote desktop isolator software 826. In an exemplary embodiment of the invention, a customized version of client-side remote desktop isolator software 826 and/or client-side remote desktop software 730 may be used. In an exemplary embodiment of the invention, the client-side remote desktop isolator software 826 is the sole executable software of client-side isolator processor 824 and the code is stored in read-only memory so that hacking the processor with malicious code is almost impossible.

client-side remote desktop isolator software 826 act as proxy (or emulator) for the server-side remote desktop software 760, and as such it receives the keyboard and mouse (KM) data from client-side remote desktop software 730 than send the KM data to server-side remote desktop software 760. Sending the KM data is performed through the client-side channels drivers 828, and specifically the KM channel that is sending the data to the KM unidirectional isolator 834 that is part of the isolation layer 830 of remote desktop isolator 810.

KM unidirectional isolator 834 enforce unidirectional communication so that only KM data can be passed from the client side to the server side. In an exemplary embodiment of the invention, additional monitoring processing is performed to check that no suspicious malicious KM data is transferred over the KM channel. The KM data is passed to server-side channels drivers 848 which pass the KM data to server-side remote desktop isolator software 846 that executes on server-side isolator processor 844 that reside on the server-side isolation layer 840 of remote desktop isolator 810. It should be noted that the two processors 824 and 844 are completely independent and isolated from each other and other then passing RDP data between sides they cannot communicate or share any data.

In addition, remote desktop isolator 810 comprises server-side interface 842 that communicate RDP using communication link 740S. The interface may be Ethernet, Optical link or any link that is used to connect devices and hosts to a network. The server-side interface 842 is able to connect via the communication link 740S to the server-side host 750. Server-side interface 842 is internally connected to a server-side isolator processor 844. The server-side isolator processor 844 may be any processor, circuitry, FPGA, host or computer that is able to run a server-side remote desktop isolator software 846. In an exemplary embodiment of the invention, the server-side isolator processor 844 may be implemented by a standard X86 microprocessor architecture and running Microsoft windows operating system, or may be ARM based architecture running Linux operating system or the like. The processor architecture may be associated to thin/thick/zero client architectures. The server-side isolator processor 844 may execute the server-side remote desktop isolator software 846. The server-side remote desktop isolator software 846 may act as a proxy or emulator for client-side version of a remote desktop software 730. This software may be a special version of an off-the-shelf software, such as remote desktop connection from Microsoft, or any other client-side version of remote desktop software, from Apple, Citrix, HP, or the like. It should be noted that the server-side remote desktop software 760 should be compatible with the server-side remote desktop isolator software 846. In an exemplary embodiment of the invention, a customized server-side remote desktop software 760 and/or server-side remote desktop isolator software 846 may be used. In an exemplary embodiment of the invention, the client-side remote desktop isolator software 846 is the sole executable software of server-side isolator processor 844 and the code is stored in read-only memory so that hacking the processor with malicious code is almost impossible.

Server-side remote desktop isolator software 846 act as proxy (or emulator) for the client-side remote desktop software 730, and as such it receives the display data from server-side remote desktop software 760 than send this data (may be just a video stream) to client-side remote desktop software 730. Sending the display data is enabled using the server-side channels drivers 848. The display data in remote desktop systems can be represented in two ways: (1) descriptive data of the desktop objects on the display, like, windows frames, icons, menu, etc., hereinafter a "native desktop data", or (2) a video stream. When native desktop data is provided, the client-side remote desktop software 730 redraws the display in accordance with the native desktop data information and when a video stream version is provided the client-side remote desktop software 730 project the video stream on the display. While sending native desktop data may demand less bandwidth from the communication link and make in some cases the synchronization between KM data and display data easier, it is less secure and more complex to handle in the remote desktop isolator 810. Both cases might be supported, and since, for example, a window in the desktop might contain a video stream any RDP solution can support using video stream for the full desktop, i.e., the display is represented as a video stream covering all desktop area. In an exemplary embodiment of the invention, the remote desktop isolator 810 may convert native desktop data to video stream and enforce the system to work in a more secure full screen video mode for the display data. In any of the cases, the display data is transferred from server-side remote desktop isolator software 846 to server-side channels drivers 848. Server-side channels drivers 848 may convert the video stream format from IP video stream to more native unidirectional video format, such as, HDMI, DisplayPort, or the like, or even to analog video format in order to prevent any hidden data transfer between the server-side host 750 and client-side host 710. Similarly, the video conversion may be done inside the isolator layer 830 of remote desktop isolator 810.

The display data, in any of the possible formats, is transferred to display/video unidirectional isolator 832 and through the client-side channels drivers 828 to client-side remote desktop isolator software 826. The display data may convert the video format back to original or to another format on the isolator layer, the channel driver or the software. From software 826 the display data is sent to the client-side remote desktop software 730 which take care to send it to user 702 display on console 720.

display/video unidirectional isolator 832 enforce unidirectional communication so that only display data can be passed from the server side to the client side. In an exemplary embodiment of the invention, additional monitoring processing is performed to check that no malicious display data is getting over this channel. It should be noted that processor 844 are completely independent and isolated from processor 824. Optionally, each of the processors communicates in different RDP protocol.

In addition to the KM data and the display data, in some of the remote desktop systems other input or output devices may be supported. For example, user 702 might have the ability to receive audio streams (mono or stereo) from server-side host 750. In this case, audio unidirectional isolator 836 may transfer unidirectional digital or analog audio that originated from server-side remote desktop software 760, pass through server-side desktop isolator layer 840 and then the isolator transfers the secured audio data to client-side desktop isolation layer 820. Additionally or alternatively, the audio stream may be handled inside the display data video stream.

Other audio devices, like Microphone, may be supported as well by the system. Mic audio data direction and the unidirectional data flow enforcement is reversed in this case. Special MIC unidirectional isolator 836 may be provided for this service in isolator layer 830.

The remote desktop isolator 810 may also support a video camera (i.e., a cam) in the client side, in this case the video stream is handled similarly by the remote desktop isolator 810 where the security and unidirectional enforcement is provided by cam unidirectional isolator 836.

One important issue for cyber security in such remote desktop systems is the authentication of user 702. Since the client-side host is not inside organization promises, it is important to authenticate the user. In an exemplary embodiment of the invention, a biometric sensor is used to authenticate user 702. The authentication data is either forward to the remote desktop isolator 810 and the authentication is made there, preferably on the server-side desktop isolator layer 840 or the authentication data is transferred through the remote desktop isolator 810 to the server-side host 750 and user 702 is authenticated there. In any case, the RDP session is not active before there is full authentication of user 702 to the system.

Another important issue is the RDP data passing through the Internet 40. To prevent any data eavesdropping, all RDP data passing through the communication links 740 are encrypted using virtual private network (VPN) solution or the like.

While the remote desktop isolator 810 of FIG. 13 may be located in the office of the worker, where the client-side ethernet port of the isolator is connected to non-classified network (e.g., the internet 40) port and the server-side ethernet port of the isolator connected to the classified (preferably isolated) network. Many other deployment options and system configuration of for the remote desktop isolator are possible.

For example, many remote desktop isolators 810 may be deployed in central location in the organization and they may be associated statically or dynamically with server-side hosts located in the offices of the workers. Alternatively, many virtual hosts 780 instances may be dynamically initiated over virtualization machines/farm 770. These virtual hosts 780 are loaded with server-side remote desktop software 760V that are dynamically assigned to desktop isolator 810. The user 702 may connect or authenticate to one of the remote desktop isolators 810 and get access to one of the virtual hosts 780.

FIG. 15 is a block diagram presenting several deployment options for remote desktop systems, such as a system 900, incorporating remote desktop isolators. On the left side of the figure there are two types of deployment for organization with isolated organization network 742. In the bottom side of the figure, the client-side port 822 of remote desktop isolator 810A is connected directly to the internet 40. This can be through unclassified network with a router connected to the internet or even direct wireless connection through cellular network such as 5G network that provide low latency and sufficient data bandwidth. In an exemplary embodiment of the invention, the client-side host 710 may be connected to 5G cellular network as well. The server-side of remote desktop isolator 810A is connected to server-side host 750. Server-side host 750 is connected to the organization network 742 with one communication Link, e.g., Ethernet, while with another separate communication Link, host 750 is connected to server-side interface 842 of remote desktop isolator 810A. This communication Link might be another communication Link type, such as USB or the like. In an exemplary embodiment of the invention, remote desktop isolator 810A is small form-factor low-cost device designed to be deployed in proximity to a desktop computer (e.g., host 750) in the office of the worker of the organization. The managing and control of remote desktop isolator 810A may be done by software running on the near-by host 750.

In the top left side of the figure, there is a central deployment of remote desktop system for organization with isolated organization network 742. The organization have a central computing facility 770 with high performance host computer or computer farm that can instantiate and initiate a plurality of server-side hosts 780 each with server-side remote desktop software 760V. The hosts 780 can access internal resources through organization network 742. The server-side port of a remote desktop multi-session isolator 810M is also connected to the organization network. The client-side port of the remote desktop multi-session isolator 810M is connected to the Internet 40. Remote desktop multi-session isolator 810M may support simultaneously a plurality of RDP sessions with a plurality of instances of server-side hosts 780. Remote desktop multi-session isolator 810M may comprises multiple replicates of the remote desktop isolator 810 shown in FIG. 14. Alternatively, remote desktop multi-session isolator 810M may be designed to share some hardware, for example, processors 824 and 844 may run each multiple instances of client-side remote desktop isolator software 826 and server-side remote desktop isolator software 846 respectively. Remote desktop multi-session isolator 810M may be managed and control from a single management software that may enable of disable each session, take care for association between server-side hosts 780 and isolators instances in remote desktop multi-session isolator 810M as well as users 702 authentication. In an exemplary embodiment of the invention, this management software is operated and monitored by manually human operator to enhance the security of the system.

On the right side of FIG. 15 there are two deployments of the remote desktop system over host infrastructure on a general cloud-based services. In the bottom side of the picture a single server-side host 750 is connected to the cloud computer center network 744 and to the server-side port 842 of remote desktop isolator 810. Client-side port 822 of this isolator is connected to the cloud computer center network 744. In this configuration user 702 have an option to open an RDP session through the isolator, however, in addition, without any restriction on the firewall 76 or the server-side host 750 a less secure direct RDP session to server-side host 750 may also be opened by user 702. Note that since both ports of the remote desktop isolator are essentially connected to the same network the isolator may be exploit to the same cyber security attack from both the client-side port and the server-side port so that this configuration is inherently less secure.

The right top side show more realistic deployment of remote desktop system with isolator on the cloud. In this configuration the organization lease computing services from the cloud services provider that have a central computing facility 770. The facility may instantiate server-side hosts 780 with server-side remote desktop software 760V. The cloud computing service provider also deployed remote desktop multi-session isolator 810M to enable RDP session from user 702 to the server-side remote desktop software 760V. While the client-side remote desktop software 730 may be access the client-side port of remote desktop multi-session isolator 810M from the cloud computing center network 744 through the general-purpose firewall 76, the server-side remote desktop software 760V may contact the server-side port of remote desktop multi-session isolator 810M only through a second firewall 976. Firewall 976 allow communication only between server-side remote desktop software 760V and the remote desktop multi-session isolator 810M as well as restrict the communication only for RDP data, hence create a more secure remote desktop solution then the one without the remote desktop isolator as presented in FIG. 12. This configuration is somewhat less secure than the configuration of the organization isolated network presented on the top-left of the figure but still can be used for organization that do not have isolated networks.

It should be understood that other configurations of deploying the remote desktop isolator are possible as well as combining the isolators with other known in the art software security tools and/or hardware security tools is also covered by this invention.

It is to be understood that the invention is not necessarily limited in its application to the details of the exemplary cyber security configurations set forth in the following description and/or illustrated in the drawings is capable of embodied in other embodiments or of being practiced or carried out in various types of devices.

It is to be understood that the invention is not necessarily limited in its application to the details of the exemplary cyber security cable set forth in the following description and/or illustrated in the drawings is capable of embodied in other embodiments or of being practiced or carried out in various types of devices.

It is expected that during the life of a patent maturing from this application many relevant client types, peripheral devices, and communication protocols will be developed and the scope of the invention intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computing system comprising:

a plurality of hosts;

a console comprising at least a first keyboard, a first mouse and a first display;

a secure peripheral sharing device; and a remote console subsystem comprising at least a second keyboard, a second mouse and a second display, wherein the secure peripheral sharing device is configured to be connected to the console and the plurality of hosts, the peripheral sharing device is configured to be coupled to the remote console subsystem that is located away from the peripheral sharing device, and wherein the secure peripheral sharing device is configured to connect or couple between either the console or the remote console subsystem and an active host of the plurality of hosts, and wherein the peripheral sharing device is configured to switch any one of the plurality of host to become the active host, and wherein a video stream from the active host is transferred to either the first display or the second display, and a keyboard and mouse data is transferred to the active host from either the first keyboard and the first mouse or the second keyboard and the second mouse.

2. The computing system of claim 1, wherein the secure peripheral device is a secure KVM switch.

3. The computing system of claim 1, wherein at least one peripheral device in the console or the remote console is shared using simultaneous use operation.

4. The computing system of claim 1, wherein at least one peripheral device in the console or the remote console is at least on of or any combination of: a biometric sensor, an identification device, a printer, an audio device, a camera, an external mass storage device, a USB dongle, a phone, and a smartphone.

5. The computing system of claim 1, wherein the connection between the secure peripheral sharing device and the console, and the connection between the remote console subsystem and the remote console is provided by peripheral devices communication protocols, and peripheral devices communication protocols comprises at least one of or any combination of: USB, SPI, I2C, SCSI, FC, IDE, ATA, Firewire, Ethernet, Thunderbolt, InfiniBand, VGA, DVI, HDMI, DisplayPort, Wi-Fi, Bluetooth, and Zigbee.

6. The computing system of claim 1, wherein the coupling between the secure peripheral sharing device and the remote console subsystem is provided by remote console communication protocols, and the remote console communication protocols comprises at least one of or any combination of: Ethernet, SDH, SONET, OTN, FC, InfiniBand, USB, Firewire, Thunderbolt, GSM, CDMA, LTE, 3G, 4G, 5G, TCP/IP, UDP, FTP, HTTP, and SNMP.

7. The computing system of claim 6, wherein the remote console communication protocol transfers video stream, the keyboard and mouse data, and active host selection commands.

8. The computing system of claim 6, wherein the remote console communication protocol further transfers: additional video streams, session control and authentication data, and data of additional peripheral devices.

9. The computing system of claim 1, wherein the communication between the remote console subsystem and the secure peripheral sharing device is encrypted.

10. The computing system of claim 1, wherein the secure peripheral sharing device comprises a security unit that perform at least one or any combination of (a) encrypt data sent to the remote console subsystem, (b) decrypt data received from the remote console subsystem, and (c) authenticate the remote console subsystem.

11. The computing system of claim 1, wherein an authentication procedure is performed between secure peripheral sharing device and remote console subsystem, and the authentication procedure comprises at least one of or any combination of: (a) Hardware ID authentication, (b) biometric authentication, (c) smart card authentication, (d) password authentication, (e) one time password authentication, and (f) multi-factor authentication.

12. The computing system of claim 1, wherein the secure peripheral sharing device communicates with the remote console subsystem using at least one of: (a) Ethernet modem, (b) Wi-Fi modem, and (c) 5G cellular modem.

13. The computing system of claim 1, wherein the paths between peripheral devices and hosts in the system comprises device emulators and host emulators.

14. The computing system of claim 1, wherein the video processing between hosts and displays comprises at least one of or any combination of: (a) compression, (b) decompression, (c) packetizing, (d) video format conversion, and (e) display EDID emulation.

15. The computing system of claim 1, wherein the remote console subsystem comprises at least one of: (a) desktop computer, (b) laptop computer, (c) notebook computer, (d) tablet, (e) PDA, (f) smartphone, and (g) thick, thin or zero client.

16. The computing system of claim 1, wherein the remote console subsystem comprises front panel or auxiliary front panel to receive active host selection commands from these panels.

17. The computing system of claim 1, wherein the secure peripheral sharing device comprises of ordinary secure KVM switch and auxiliary remote console adapter.

18. The computing system of claim 1, wherein the secure peripheral sharing device comprises of basic secure KVM switch and add-on adapter, wherein matching form-factor between basic secure KVM switch and add-on adapter is extension form-factor or bay form-factor.

19. The computing system of claim 1, wherein the secure peripheral sharing device or the remote console subsystem comprises anti-tampering circuitries.

20. The computing system of claim 1, wherein the secure peripheral sharing device is configured to receive enable remote console operation mode from control center.

21. The computing system of claim 1, wherein the secure peripheral sharing device comprises Ethernet switch to aggregate communication from first Ethernet port and remote console communication to a second Ethernet port.

22. A secure peripheral sharing device comprising:

a plurality of ports to be configured to be connected to a plurality of hosts; and a port to be configured to be connected to a console comprising at least a first keyboard, a first mouse and a first display; and a remote console port configured to be coupled to a remote console subsystem comprising at least a second keyboard, a second mouse and a second display, wherein the remote console subsystem is located away from the peripheral sharing device, and wherein the peripheral sharing device is configured to connect or couple between either the console or the remote console subsystem and an active host of the plurality of hosts, and wherein the peripheral sharing device is configured to switch between any one of the plurality of hosts to become the active host.

23. The secure peripheral sharing device of claim 22, wherein at least one peripheral device in the console or the remote console is at least on of or any combination of: a biometric sensor, an identification device, a printer, an audio device, a camera, an external mass storage device, a USB dongle, a phone, and a smartphone.

24. The secure peripheral sharing device of claim 22, wherein the connection between the secure peripheral sharing device and the console, and the connection between the remote console subsystem and the remote console is provided by peripheral devices communication protocols, and peripheral devices communication protocols comprises at least one of or any combination of: USB, SPI, I2C, SCSI, FC, IDE, ATA, Firewire, Ethernet, Thunderbolt, InfiniBand, VGA, DVI, HDMI, DisplayPort Wi-Fi, Bluetooth, and Zigbee.

25. The secure peripheral sharing device of claim 22, wherein the coupling between the secure peripheral sharing device and the remote console subsystem is provided by remote console communication protocols, and the remote console communication protocols comprises at least one of or any combination of: Ethernet, SDH, SONET, OTN, FC, InfiniBand, USB, Firewire, Thunderbolt, GSM, CDMA, LTE, 3G, 4G, 5G, TCP/IP, UDP, FTP, HTTP, and SNMP.

26. The secure peripheral sharing device of claim 25, wherein the remote console communication protocol transfers video stream, the keyboard and mouse data, and active host selection commands.

27. The secure peripheral sharing device of claim 26, wherein the remote console communication protocol further transfers: additional video streams, session control and authentication data, and data of additional peripheral devices.

28. The secure peripheral sharing device of claim 22, wherein the secure peripheral sharing device comprises a security unit that perform at least one or any combination of (a) encrypt data sent to the remote console subsystem, (b) decrypt data received from the remote console subsystem, and (c) authenticate the remote console subsystem.

29. The secure peripheral sharing device of claim 22, wherein the secure peripheral sharing device comprises of ordinary secure KVM switch and auxiliary remote console adapter.

30. The secure peripheral sharing device of claim 22, wherein the secure peripheral sharing device comprises of basic secure KVM switch and add-on adapter, wherein matching form-factor between basic secure KVM switch and add-on adapter is extension form-factor or bay form-factor.

31. The secure peripheral sharing device of claim 22, wherein the secure peripheral sharing device comprises Ethernet switch to aggregate communication from first Ethernet port and remote console communication to a second Ethernet port.

32. A remote console subsystem comprising:

a port configured to be coupled to a secure peripheral sharing device; and a remote console, wherein, the secure peripheral sharing device is configured to be connected to a plurality of hosts, and to a console comprising at least a first keyboard, a first mouse and a first display, the remote console comprising at least a second keyboard, a second mouse and a second display, the remote console subsystem is located away from the peripheral sharing device, the peripheral sharing device is configured to connect or couple between either the console or the remote console and an active host of the plurality of hosts, and condition upon a switching command from the remote console subsystem, the peripheral sharing device is configured to switch any one of the plurality of hosts to become the active host.

33. The remote console subsystem of claim 32, wherein the remote console subsystem comprises a security unit that perform at least one or any combination of (a) encrypt data sent from the remote console subsystem, (b) decrypt data received to the remote console subsystem, and (c) authenticate the secure peripheral sharing device.

34. The remote console subsystem of claim 32, wherein an authentication procedure is performed between secure peripheral sharing device and remote console subsystem, and the authentication procedure comprises at least one of or any combination of: (a) Hardware ID authentication, (b) biometric authentication, (c) smart card authentication, (d) password authentication, (e) one time password authentication, and (f) multi-factor authentication.

35. The remote console subsystem of claim 32, wherein the remote console subsystem communicates with the secure peripheral sharing device using at least one of: (a) Ethernet modem, (b) Wi-Fi modem, and (c) 5G cellular modem.

36. The remote console subsystem of claim 32, wherein remote console subsystem comprises host emulators configured to communicate with device emulators for any one of the peripheral devices of the remote console subsystem.

37. The remote console subsystem of claim 32, wherein the remote console subsystem comprises at least one of: (a) a desktop computer, (b) a laptop computer, (c) a notebook computer, (d) a tablet, (e) a PDA, (f) a smartphone, and (g) a thick, a thin or a zero client.

38. The remote console subsystem of claim 32, wherein the remote console subsystem comprises front panel or auxiliary front panel to receive active host selection commands from these panels.

39. The remote console subsystem of claim 32, wherein the remote console subsystem comprises a smartphone and remote console accessory.

* * * * *